(12) United States Patent
Estes et al.

(10) Patent No.: US 11,278,032 B1
(45) Date of Patent: Mar. 22, 2022

(54) SUPPORT FOR CARRYING A CHICKEN THROUGH A DEBONING PROCESS

(71) Applicant: ACE, LLC, Russellville, AR (US)

(72) Inventors: Andrew C. Estes, Russellville, AR (US); Jeremy B. Estes, Russellville, AR (US)

(73) Assignee: ACE, LLC, Russellville, AR (US)

( * ) Notice: Subject to any disclaimer, the term of this patent is extended or adjusted under 35 U.S.C. 154(b) by 0 days.

(21) Appl. No.: 17/105,808

(22) Filed: Nov. 27, 2020

(51) Int. Cl.
*A22C 21/00* (2006.01)

(52) U.S. Cl.
CPC ...... *A22C 21/0046* (2013.01); *A22C 21/0053* (2013.01); *A22C 21/0069* (2013.01)

(58) Field of Classification Search
CPC ............ A22C 21/0046; A22C 21/0053; A22C 21/0069
USPC ........................................ 452/135, 173, 174
See application file for complete search history.

(56) References Cited

U.S. PATENT DOCUMENTS

| 6,042,468 A * | 3/2000 | Lucero ............... A22C 21/0046 452/165 |
| 2006/0030252 A1* | 2/2006 | Tiemann ............ A22C 21/0038 452/185 |

* cited by examiner

*Primary Examiner* — Richard T Price, Jr.
(74) *Attorney, Agent, or Firm* — Richard Blakeley Glasgow

(57) ABSTRACT

A support for carrying a front-half of a chicken through a deboning process, including an upper portion, a lower portion, and a base for attaching to a conveyor belt. The upper portion includes a first shelf and a second shelf for resting under the shoulder knuckles of the front-half of the chicken and a protrusion positioned between the first shelf and the second shelf for spreading the shoulder knuckles. The lower portion of the support has two sections for resting under the breast meat of the front-half of the chicken. The first section of the lower portion of the support slopes downward and outward from the upper portion, while the second section of the lower portion slopes downward and inward from the first section.

3 Claims, 26 Drawing Sheets

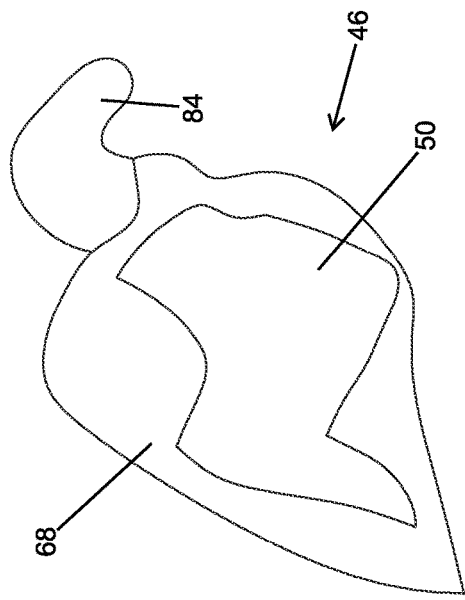
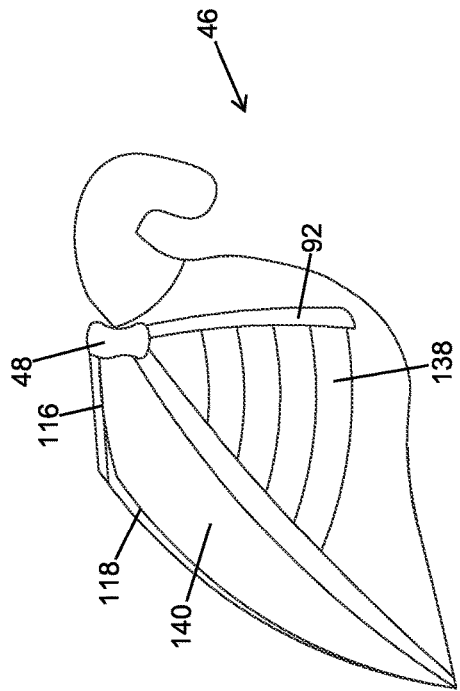
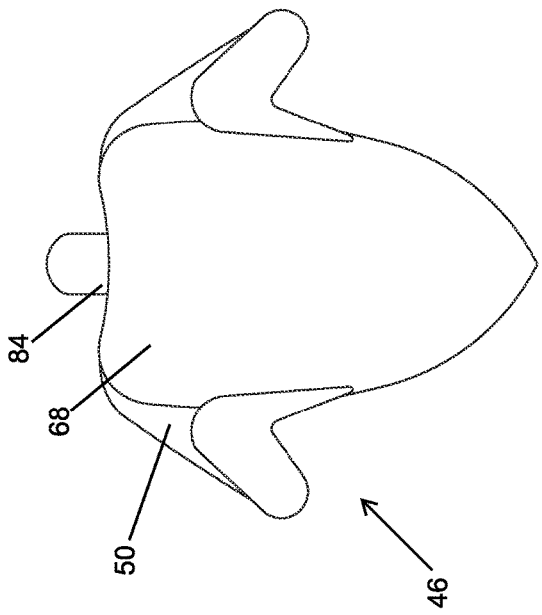
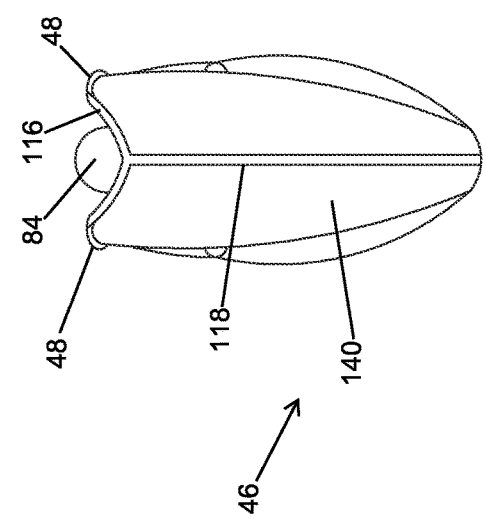

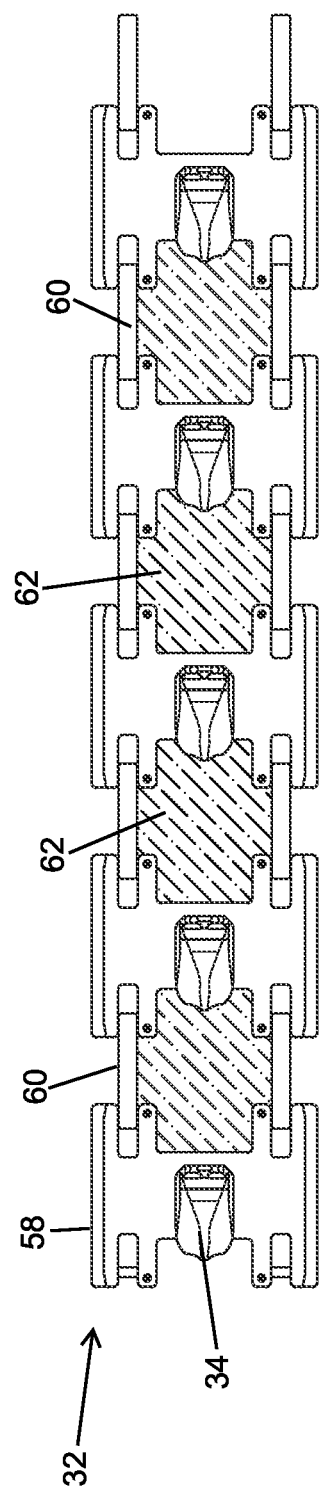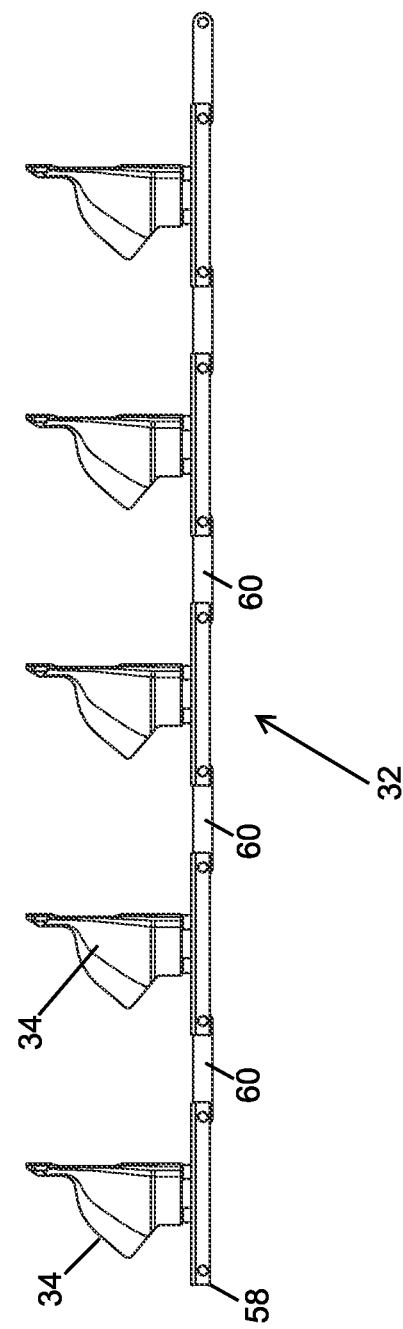

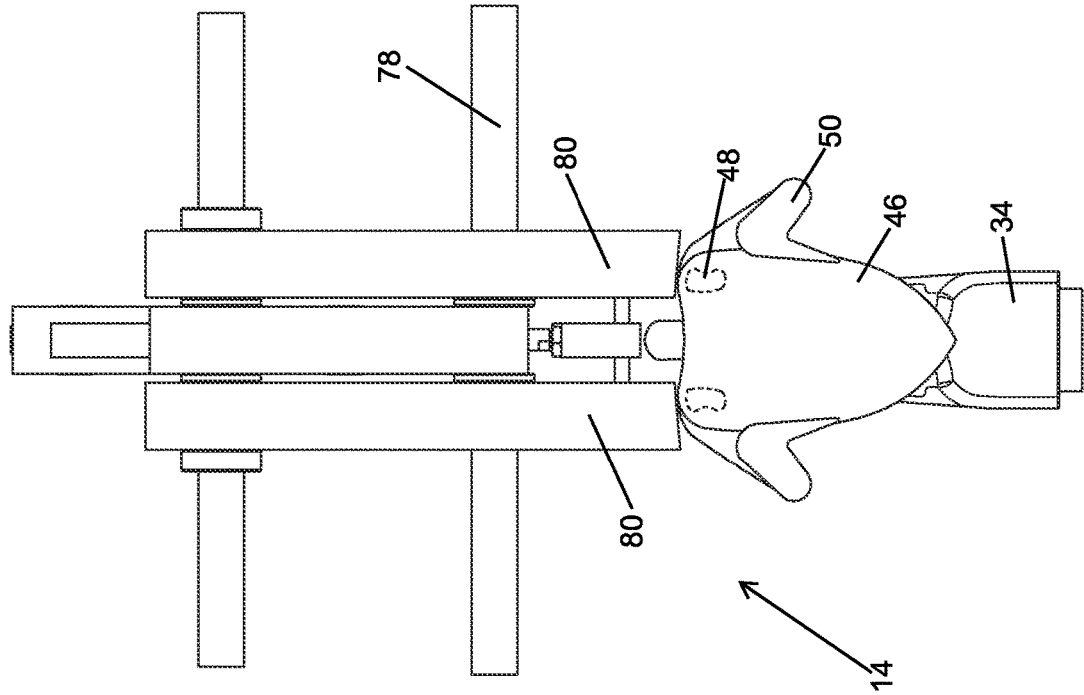
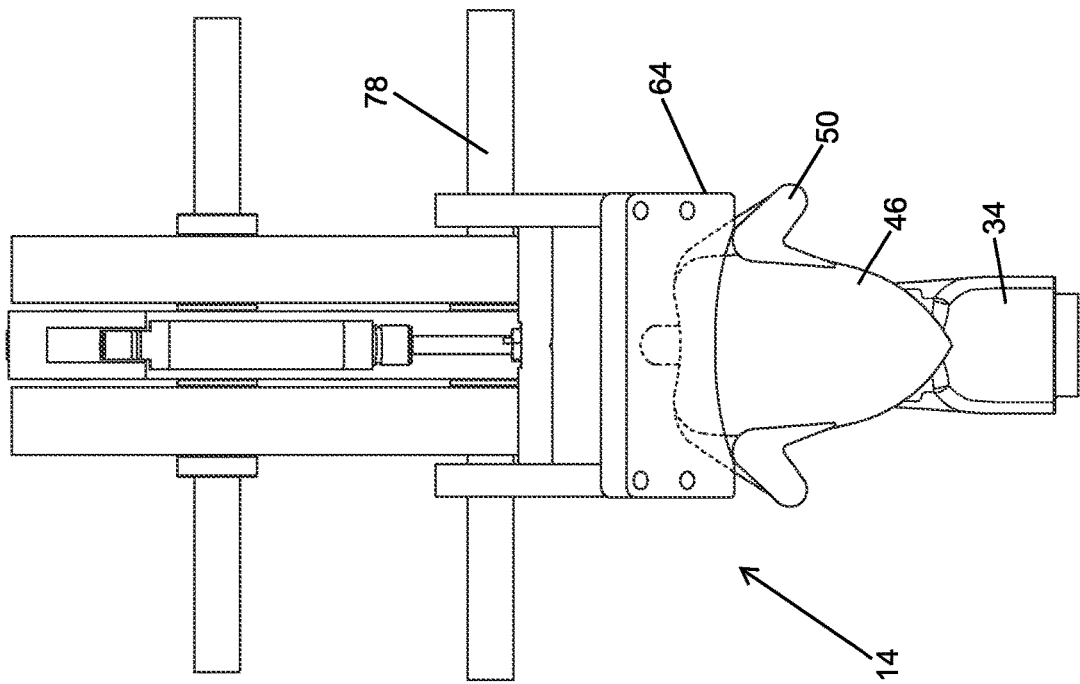
FIG. 6A
FIG. 6B

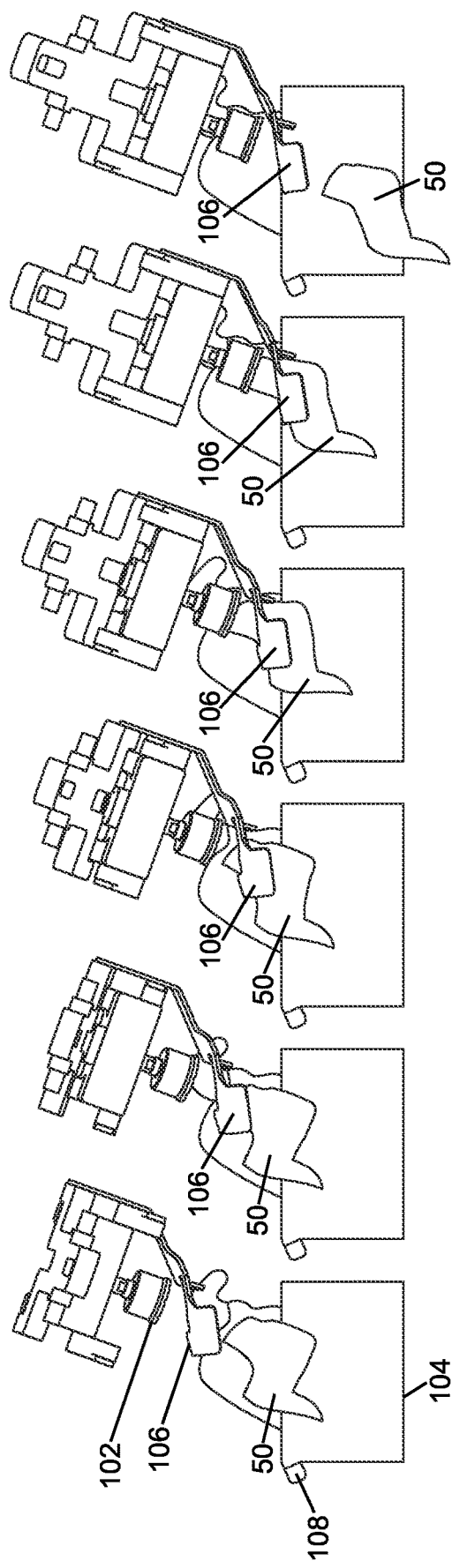

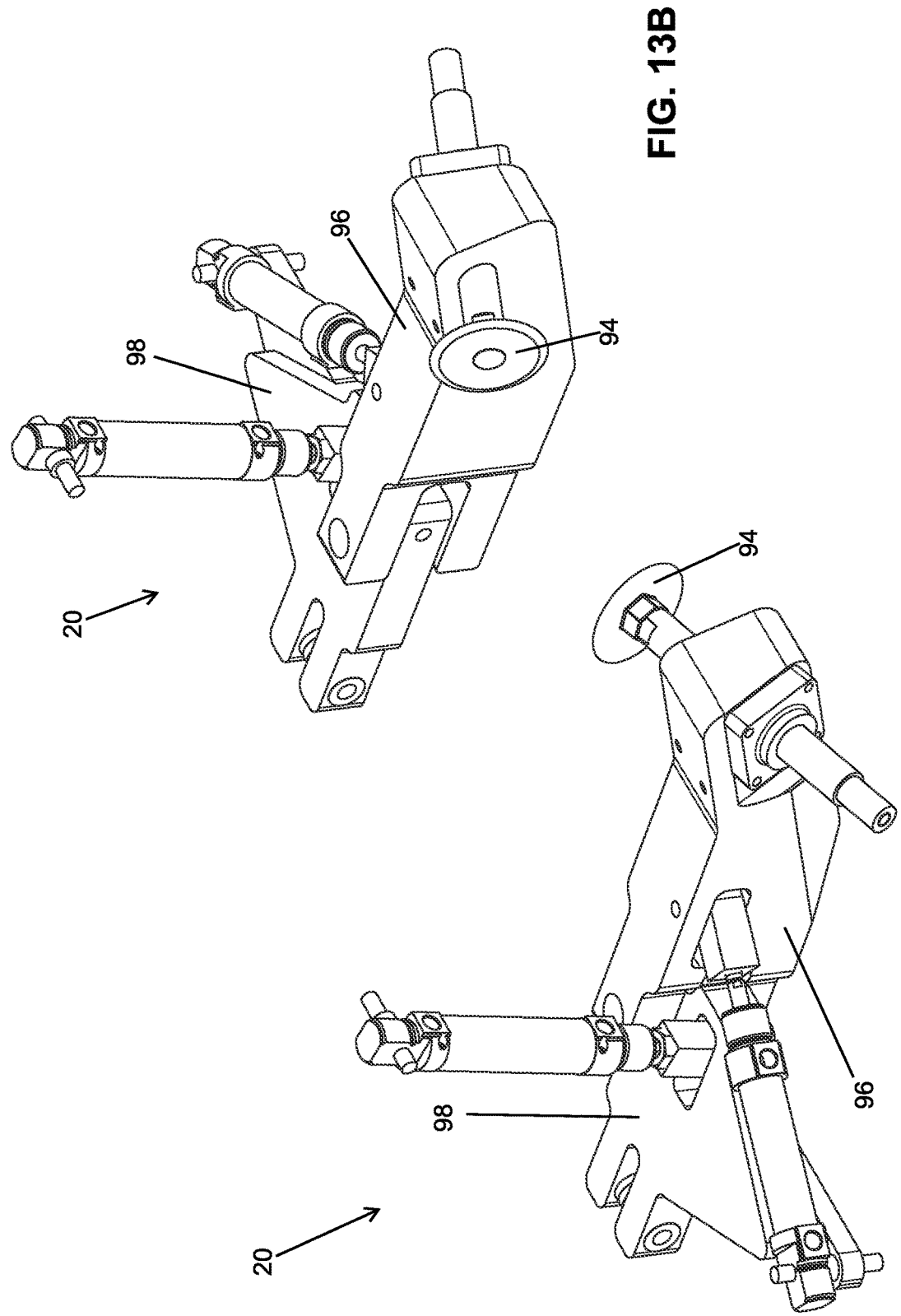

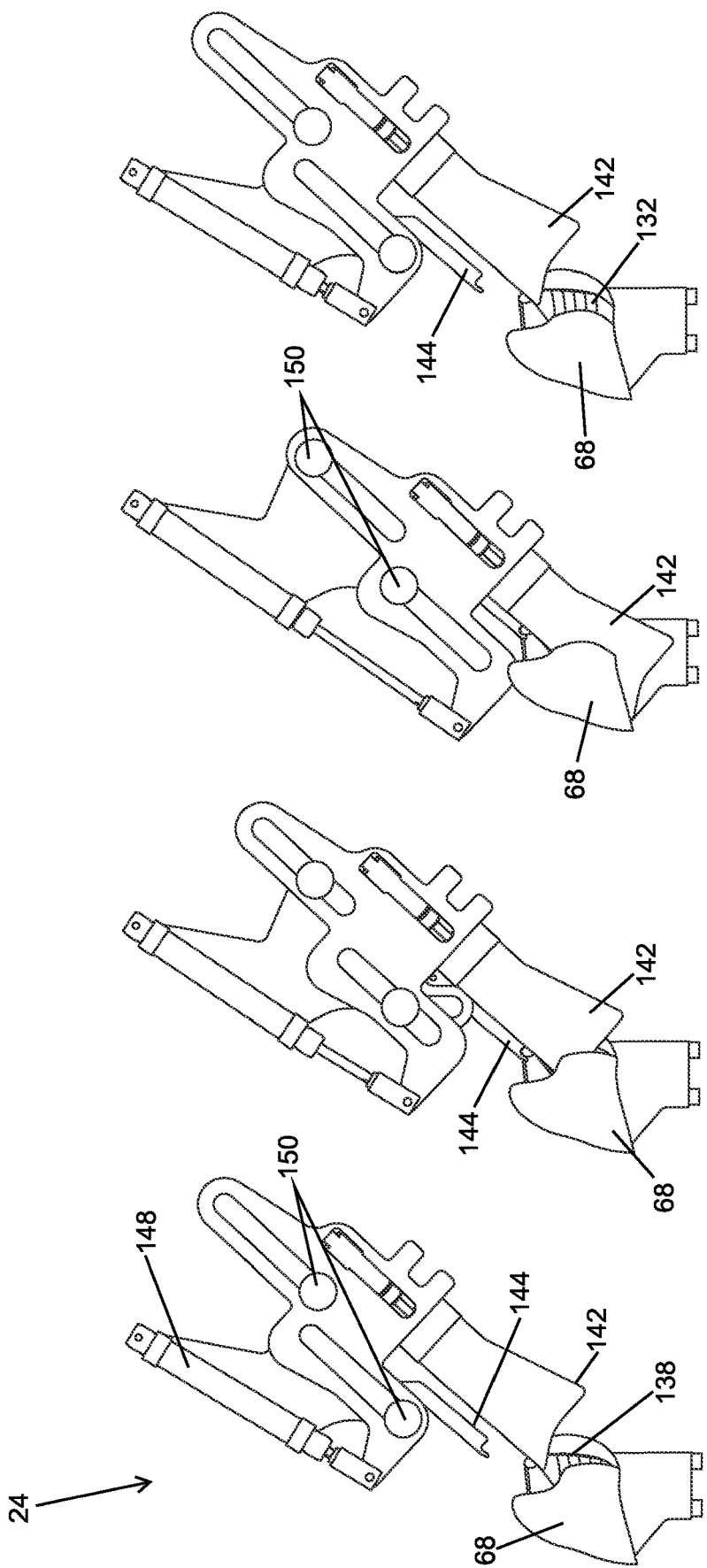

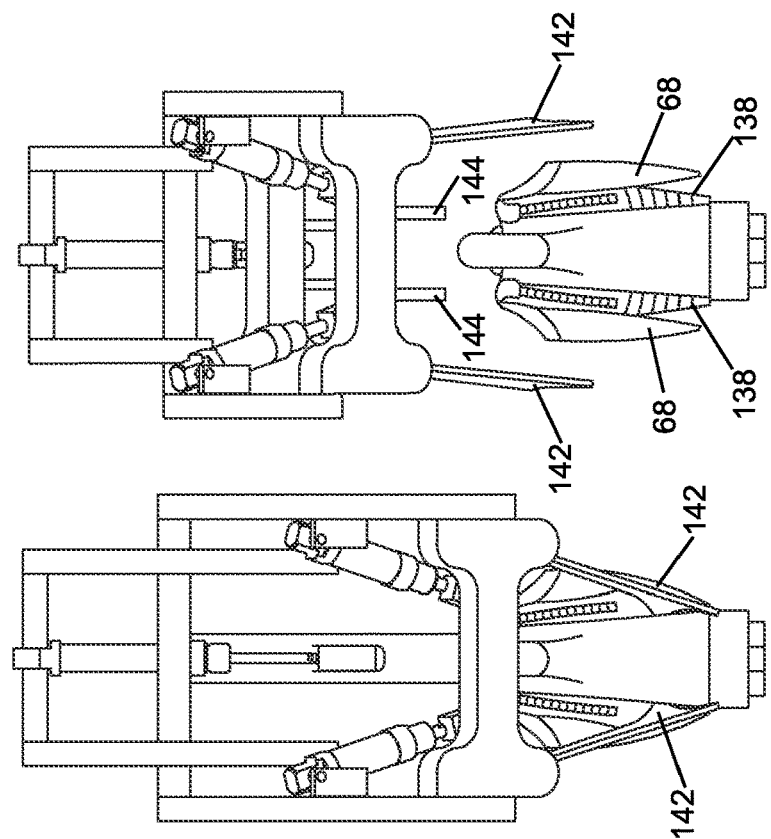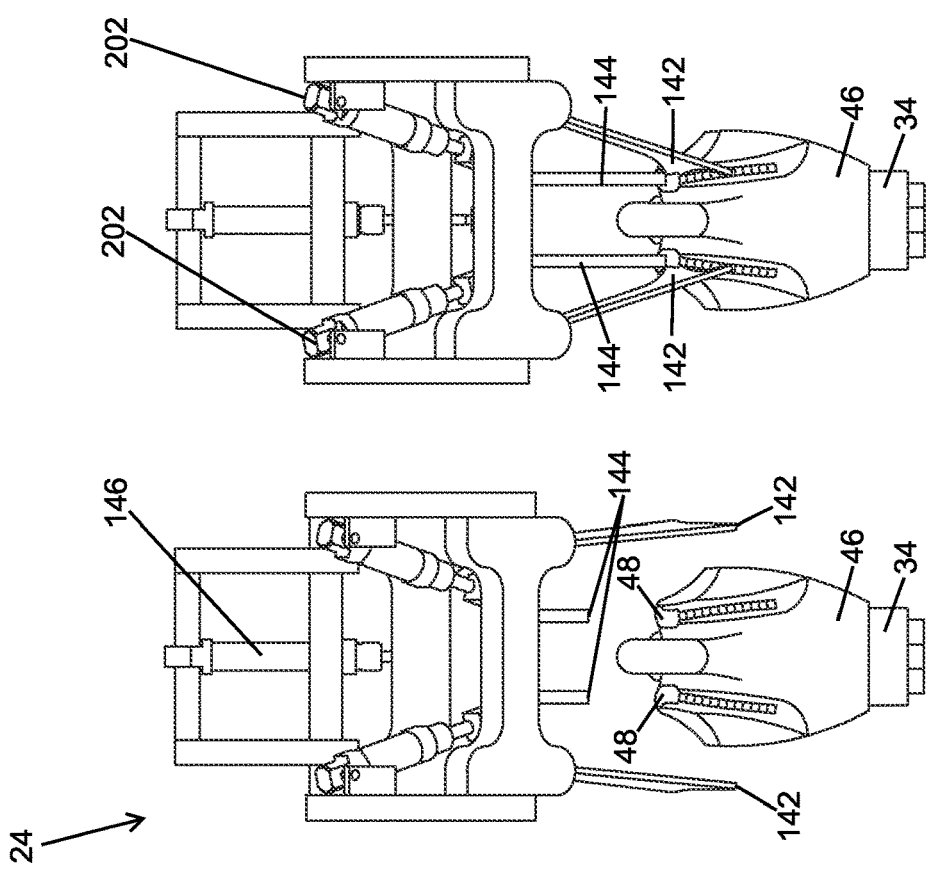

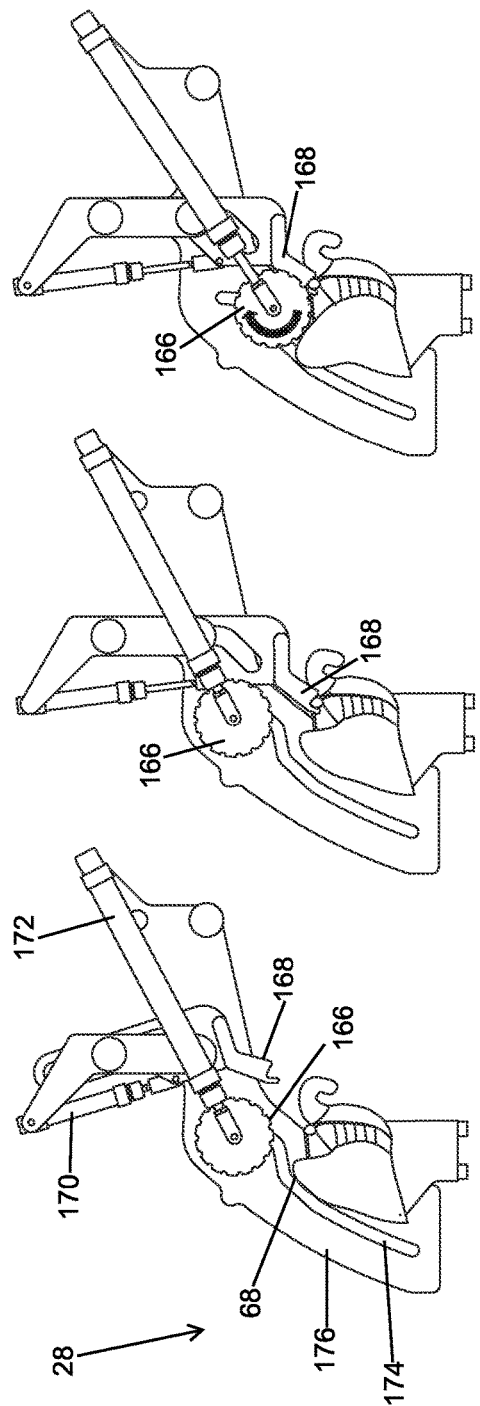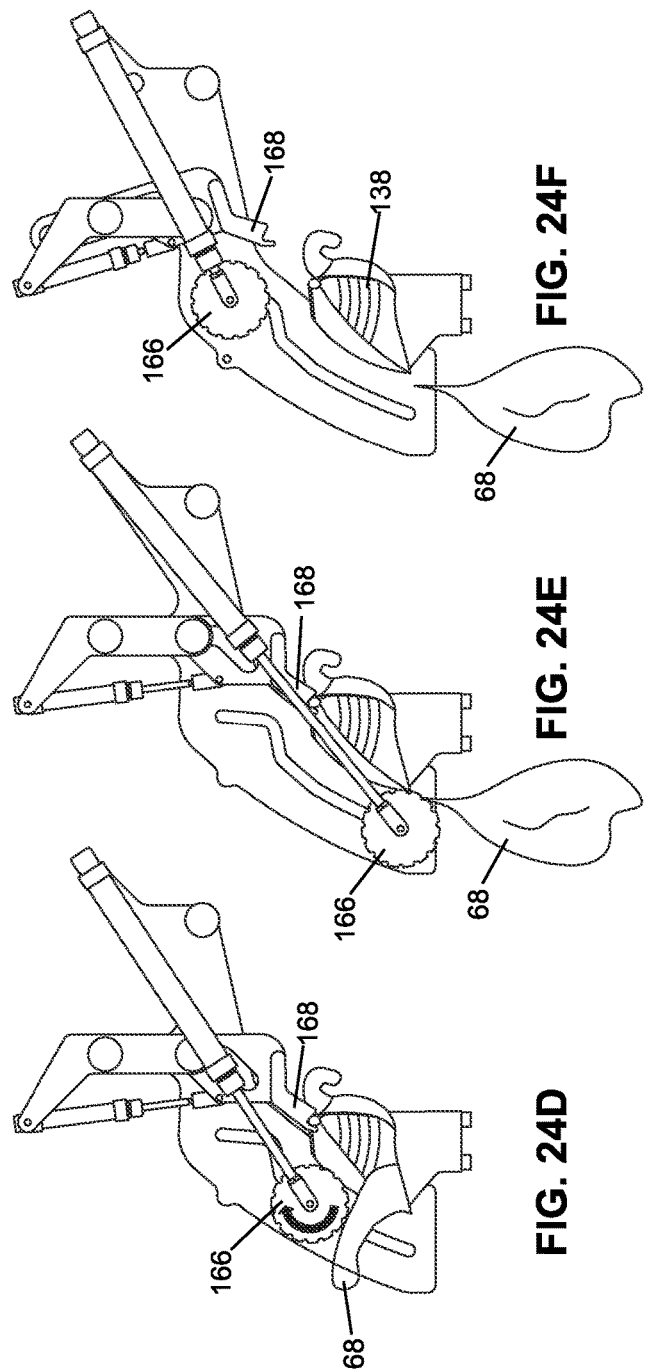

US 11,278,032 B1

SUPPORT FOR CARRYING A CHICKEN THROUGH A DEBONING PROCESS

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to an automated system and method for deboning the front-half of a chicken. In a typical poultry processing plant, chicken is processed into two-halves. The front-half, which includes the wings, breast meat, and tenders of the chicken, is cut from the legs and thighs. The front-half and back-half proceed to different locations in the processing plant to be further processed. Poultry processing plants use one of two options (or sometimes a combination of both) to process the front-half of the chicken: manual processing or automated processing. In a manual processing line, people cut and pull the meat from the chicken carcass by hand using handheld knives for some of the processes. In an automated processing line, machinery is used to cut and separate the meat from the chicken carcass. The goal of both methods is to remove the highest percentage of meat from the chicken carcass quickly and consistently. There are benefits and drawbacks for both manual and automated processing.

For manual deboning, the poultry processing plant must hire 8-12 workers to operate one processing line (i.e., cone line). Plants typically have multiple cone lines. Most processing plants also utilize two shifts which doubles the number of workers required for manual deboning. Manual deboning is a tedious and taxing job for these workers. Workers perform the same repetitive action for each chicken they process. Performing the same motions to process the chickens hour after hour can lead to injuries and unpleasant work conditions for the workers. This leads to difficulties maintaining staffing and leaves many plants under-staffed for these manual deboning lines.

When a processing plant implements automated deboning, the workers needed to process the same number of birds per minute is greatly reduced. But automated deboning machines typically struggle with achieving the same levels of yield as manual deboning. The machines are unable to remove the meat from the chickens as efficiently. The meat that is left behind on the chicken carcass results in huge profit losses as this meat is either thrown away or sold at lower prices with the carcass.

It would therefore be desirable to develop an automated deboner system to process the front-half of a chicken to reduce the number of workers operating per cone line, achieve a comparable or better yield, and reduce the footprint of the processing area in the plant.

BRIEF SUMMARY OF THE INVENTION

The present invention is directed to an automated chicken deboner system and method. The deboner system utilizes a conveyor system to process and move the front-half of the chicken through the different deboning stations attached along a frame. The system includes the following stations: (1) a loading station where the bird is placed on a cone; (2) a press station to align the front half of the chicken on the cone; (3) a skin cutter station to cut the skin and fat located at the base of the neck of the bird; (4) a wing cutter station to remove the wings from the bird; (5) a scapula cutter station to separate the breast meat from the scapula; (6) a wishbone cutter station to separate the breast meat from the wishbone; (7) a breast plow station to separate the breast meat from the ribs of the bird; (8) a wishbone paddle station to further separate the breast meat from the wishbone; (9) a breast removal station to completely remove the breast meat from the bird; and (10) a tender cutter station to remove the two tenders from the bird.

These and other features, objects and advantages of the present invention will become better understood from a consideration of the following detailed description of the preferred embodiments and appended claims in conjunction with the drawings as described following:

BRIEF DESCRIPTION OF THE DRAWINGS

FIG. 2A is a front view of a whole front-half. FIG. 2B is a side view of a whole front-half.

FIG. 3A is a front view of a front-half with the breast meat and wings removed. FIG. 3B is a side view of a front-half with the breast meat and wings removed.

FIG. 5A is a top view of the conveyor belt with cones of the deboner system of the present invention. FIG. 5B is a side view of the conveyor belt with cones of the deboner system of the present invention.

FIG. 6A is a perspective view of the first press of the press station of the present invention from the inlet end of the deboner system. FIG. 6B is a perspective view of the second press of the press station of the present invention from inlet end of the deboner system and with the first press omitted.

FIG. 11A-11F are perspective views of the wing cutter station of the present invention from the outlet end of the deboner system in six sequential steps starting with FIG.

11A and ending with FIG. 11F. FIGS. 11A-11E show one side of the wing cutter station, while FIG. 11F shows both sides of the wing cutter station. FIG. 11A shows one shoulder clamp in the up position and one blade in the up position, FIG. 11B shows one shoulder clamp in the down position and one blade in the up position, FIG. 11C shows one shoulder clamp in the down position and one blade moving down, FIG. 11D shows one shoulder clamp in the down position and one blade moving down, FIG. 11E shows one shoulder clamp in the down position and one blade moving down, and FIG. 11F shows both shoulder clamps in the down position and both blades in the down position after the wings were removed from the front-half.

FIGS. 12A-12F are side views of the wing cutter station of the present invention in six sequential steps starting with FIG. 12A and ending with FIG. 12F.

FIG. 13A is a perspective view of the left scapula cutter of the scapula cutter station of the present invention. FIG. 13B is a perspective view of the right scapula cutter of the scapula cutter station of the present invention.

FIG. 14A shows the scapula blade in the out and up positions, FIG. 14B shows scapula blade in the in and up positions, FIG. 14C shows the scapula blade in the in position and moving downward, FIG. 14D shows the scapula blade in the in and down positions, FIG. 14E shows the scapula blade in the out and down positions after the cuts have been made, and FIG. 14F shows the scapula blade in the out and up positions after the cuts have been made.

FIGS. 15A-15F are side views of the scapula cutter station of the present invention in six sequential steps starting with FIG. 15A and ending with FIG. 15F. FIG. 15A shows the scapula blade in the out and up positions, FIG. 15B shows scapula blade in the in and up positions, FIG. 15C shows the scapula blade in the in position and moving downward, FIG. 15D shows the scapula blade in the in and down positions, FIG. 15E shows the scapula blade in the out and down positions after the cuts have been made, and FIG. 15F shows the scapula blade in the out and up positions after the cuts have been made.

FIG. 17A shows the wishbone blade in the up and forward positions, FIG. 17B shows the wishbone blade in the down and forward positions, FIG. 17C shows the wishbone blade in the down and backward positions, and FIG. 17D shows the wishbone blade in the up and forward positions after the cut has been made. The forward position refers to the position towards the outlet end of the deboner system, while the backward position refers to the position towards the inlet end of the deboner system.

FIG. 18A shows the wishbone blade in the down position and sitting on the shoulder knuckles before making the cut. FIG. 18B shows a portion of the wishbone blade in the bird after making the cut.

FIGS. 19A-19D are side views of the breast plow station of the present invention in four sequential steps starting with FIG. 19A and ending with FIG. 19D. FIG. 19A shows the plow plates in the out and up positions and the shoulder clamps in the up position, FIG. 19B shows the plow plates in the in position and going down and the shoulder clamps in the down position, FIG. 19C shows the plow plates in the in and down position and the shoulder clamps in the down positions, and FIG. 19D shows the plow plates in the out and up positions and the shoulder clamps in the up position after the breast meat has been disconnected from the ribs of the bird.

FIGS. 20A-20D are perspective views of the breast plow station of the present invention from the outlet end of the deboner system in four sequential steps starting with FIG. 20A and ending with FIG. 20D. FIG. 20A shows the plow plates in the out and up positions and the shoulder clamps in the up position, FIG. 20B shows the plow plates in the in and up positions and the shoulder clamps in the down position, FIG. 20C shows the plow plates in the in and down positions and the shoulder clamps in the down position, and FIG. 20D shows the plow plates in the out and up positions and the shoulder clamps in the up position after the breast meat has been disconnected from the ribs of the bird.

FIG. 21A shows the wishbone paddle in the up and retracted positions, FIG. 21B shows the wishbone paddle is the down and retracted positions, FIG. 21C shows the wishbone paddle is in the down and extended positions, and FIG. 21D shows the wishbone paddle is in the up and retracted positions after the wishbone paddle has further disconnected the breast meat from the wishbone.

FIGS. 24A-24F are side views of the breast removal station of the present invention in six sequential steps starting with FIG. 24A and ending with FIG. 24F. FIG. 24A shows the shoulder clamps in the up position and the roller in the up position. FIG. 24B shows the shoulder clamps in the down position and the roller in the up position. FIGS. 24C-24D show the shoulder clamps in the down position and the roller going down. FIG. 24E shows the shoulder clamps in the down position and the roller in the down position. FIG. 24F shows the shoulder clamps in the up position and the roller in the up position after the breast meat has been completely removed from the bird.

FIG. 26A shows the cone aligned with the paddles, the paddles open, and the breast meat attached to the bottom of the bird. FIG. 26B shows the cone aligned with the paddles, the paddles closed, and the breast meat attached to the bottom of the bird. FIG. 26C shows the cone moved past the paddles, the paddles closed, and the breast meat detached from the bird and held between the paddles.

FIG. 27A shows the cone aligned with the paddles, the paddles open, and the breast meat attached to the bottom of the bird. FIG. 27B shows the cone aligned with the paddles, the paddles closed, and the breast meat attached to the bottom of the bird. FIG. 27C shows the cone moved past the paddles, the paddles closed, and the breast meat detached from the bird and held between the paddles.

FIG. 28A shows the shoulder clamp and the spreader in the down position with the blades in the out and up positions, FIG. 28B shows the shoulder clamp and spreader in the down position with the blades going in and in the up position, FIG. 28C shows the shoulder clamp and spreader in the down position with the blades in the in and up positions, FIG. 28D shows the shoulder clamp and spreader in the down position with the blades in the in position and going down, FIG. 28E shows the shoulder clamp and spreader in the down position and the blades in the in position and going down, and FIG. 28F shows the shoulder clamp and spreader in the down position and the blades in the in and down positions after the tenders have been completely removed from the carcass.

DETAILED DESCRIPTION OF THE INVENTION

Figure 1:
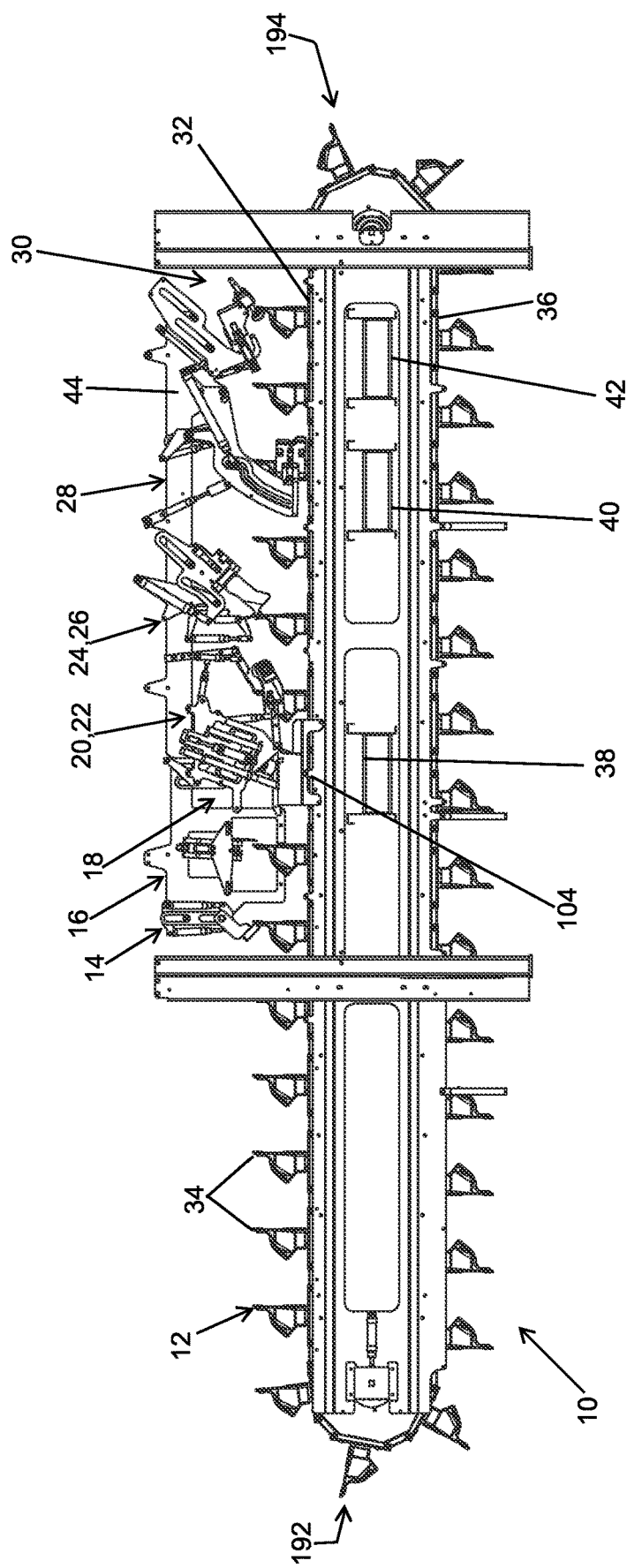
FIG. 1 is a side view of all of the stations of the deboner system of the present invention.

With reference to FIGS. 1-29, the preferred embodiments of the present invention may be described. The present invention is directed to an automated chicken deboner system and method to remove the wings, breast meat, and tenders from the carcass of the chicken. The deboner system 10 utilizes a conveyor system to process and move the front-half of the chicken (also referred to herein as a "bird" or a "carcass") through the different deboning stations attached along a frame 44. Cones 34 are mounted to the conveyor belt 32 at equal distances from one another and the front-half of the bird 46 is held on the cone 34 as it is deboned. As described individually below, the deboner system 10 includes the following stations: (1) a loading station 12 where the bird is placed on a cone; (2) a press station 14 to align the front-half on the cone; (3) a skin cutter station 16 to cut the skin and fat located at the base of the neck of the bird; (4) a wing cutter station 18 to remove the wings from the bird; (5) a scapula cutter station 20 to separate the breast meat from the scapula; (6) a wishbone cutter station 22 to separate the breast meat from the wishbone; (7) a breast plow station 24 to separate the breast meat from the ribs of the bird; (8) a wishbone paddle station 26 to further separate the breast meat from the wishbone; (9) a breast removal station 28 to completely remove the breast meat from the bird; and (10) a tender cutter station 30 to remove the two tenders from the bird.

In the first preferred embodiment, these different stations are fixed and mounted to a stationary frame 44. Each of stations (2)-(10) listed above are bolted to the frame 44. After the bird 46 is loaded onto a cone 34, the cone 34 then indexes forward through the system and stops at each stationary station to cut and/or remove a different part of meat from the front-half 46. In the second preferred embodiment, all of the stations are mounted to an upper frame 44 that indexes forward in unison with the conveyor belt 32. After the bird is loaded onto a cone, the belt 32 continuously moves the cone 34 forward and the upper frame 44 indexes forward with the belt 32 as each station performs its task. In this embodiment, once the conveyor belt 32 moved the cones underneath the stations, the upper frame 44 is synchronized and thus moves at the same speed as the conveyor belt 32. The stations are mounted to the frame 44 such that they all reach the synchronization point at the same time. This allows the stations to perform their tasks as if the birds on the cones were not moving underneath them. Once the stations have completed their task, the upper frame 44 quickly resets so it can index forward again with the following cone 34. The meat is cut and removed from the front-half 46 in the same manner in both embodiments. The first embodiment just utilizes an indexing conveyor belt and fixed frame with stations, while the second embodiment uses a continuously moving belt with an indexing frame with stations. The first embodiment in which the upper frame 44 is fixed is the preferred embodiment in part because the upper frame 44 acts as brace and stabilizes the entire system 10 in that embodiment.

Loading Station:

The deboning process begins with the front-half 46 being loaded onto a cone (or support) 34 that is mounted to the conveyor belt 32. The loading station 12 of the system is the portion of the conveyor belt 32 holding vertically oriented cones that have yet to reach the press station 14. Because the conveyor belt 32 is moving, the portion of the conveyor belt 32 in the loading station changes. The loading station is located at the inlet end 192 of the system 10. After the bird 46 moves through all of the stations at the outlet end 194 of the system, the cone 34 on the conveyor belt 32 moves underneath the frame 44 and is returned to the loading station 12. The return portion 36 of the conveyor belt 32 is shown in FIG. 1.

Figure 4A:
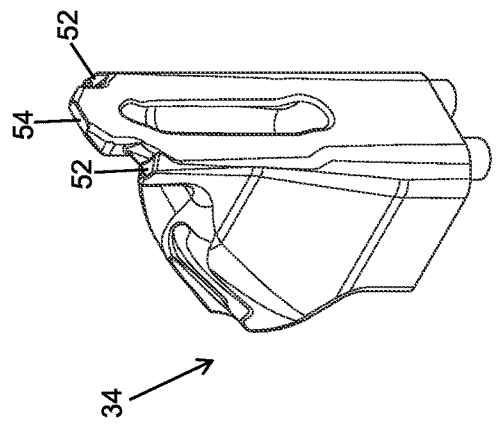
FIG. 4A is a perspective view of the cone of the deboner system of the present invention.
Figure 4C:
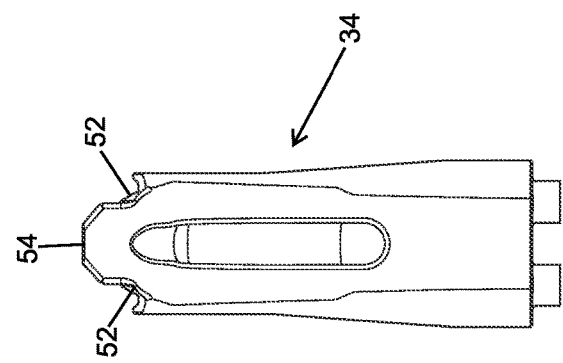
FIG. 4C is a back view of the cone of the deboner system of the present invention.
Figure 4D:
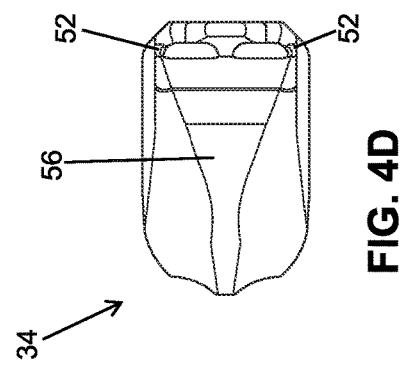
FIG. 4D is a top view of the cone of the deboner system of the present invention.
Figure 4B:
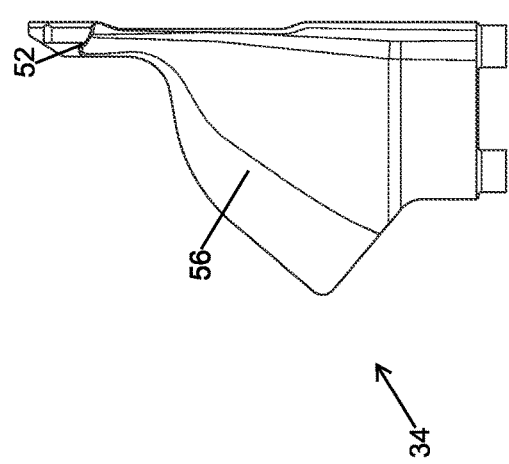
FIG. 4B is a side view of the cone of the deboner system of the present invention.

The bird has an empty inner cavity after evisceration and after the back-half of the chicken is removed. During loading, the cone 34 is pushed into the inner cavity as the bird is slid over the top of the cone. The cone is sized to substantially fill the inner cavity of the bird. The bird is loaded on the cone 34 such that the breast meat of the bird is facing away from the first cutting station or towards the inlet end of the deboner system. The back surface of the cone (i.e., the surface of the cone facing the outlet end of the deboner system) includes an oval opening, as shown in FIG. 4A and FIG. 4C. There is a bulge directly behind the neck of the bird inside the cavity of the bird. There is also a bulge inside the cavity where the ribs of the bird come together. Those bulges in the cavity of the bird are positioned inside the opening of the cone when the bird is properly positioned on the cone. The structure of the cone is critical to the effectiveness of the deboner system because the cone structure ensures that the bird is positioned correctly as the bird moves through each station of the deboner system. The bird has two shoulder knuckles 48 (one on each side) where the wings 50 are attached. It is critical that these knuckles are set at the correct height and width on the cone 34, regardless of the size variances of the birds. The deboner system utilizes these shoulder knuckle contact points as zeroing sites throughout the system to allow correct positioning of each station as they perform their task. As shown in FIGS. 4A-4D, there is a shelf 52 on each side of the upper portion of the cone 34 that the shoulder knuckle 48 sits on to set the height of the knuckle 48. In the upper center of the cone 34 is a protrusion 54 that sits between the shoulder knuckles 48 and spreads them to the same width on both small and large birds. The body 56 of the cone 34 slopes downward and outward from the base of the protrusion 54 and serves as a support for the bird under the breast meat. The body 56 then segues downward and inward to the base of the cone, as shown in FIG. 4B. The sides of the cone extend downward and slightly outward from each of the shelves 52. This cone structure allows a large size range of front-halves to be positioned and deboned accurately and precisely on the same machine.

The conveyor belt 32 (also referred to as the "primary conveyor belt") is a continuous belt which consists of cone plates 58 that are linked together, as shown in FIGS. 5A-5B. One cone plate 58 is connected to the next cone plate 58 via two links 60 on the outside of the cone plate 58. This leaves room for a large gap 62 between cone plates. The meat that is removed from the bird as it moves through the deboner system (except the wings) passes through the gap 62 between the cone plates 58. Meat that falls through the top section of the belt lands onto a transfer slide or conveyor system that runs underneath the primary conveyor belt. This transfer slide or conveyor system catches the removed meat before the meat reaches the lower return part of the primary conveyor belt and then transports the removed meat for further processing. For example, the deboner system 10 may include a breast transfer conveyor 40 that transports the removed breast meat from the deboner system 10. Similarly, the system 10 may also include tender transfer conveyor 42 that transports the removed tenders from the deboner system 10. In one embodiment, the breast transfer conveyor 40 and tender transfer conveyor 42 extend through the frame 44 of the deboner system 10, as shown in FIG. 1. This belt design with gaps eliminates the need for a separate mechanism to remove the removed meat from the deboner system.

Press Station:

Once the front half 46 is loaded onto the cone 34, the conveyor 32 indexes forward to the first automated station: the press station 14. A first (or forward) press 64 pushes the front-half 46 forward onto the cone 34. A second (or downward) press 66 then pushes downward on both shoulder joints simultaneously. The first press 64 ensures that the shoulder knuckles 48 are seated in the correct location as the second press 66 pushes the front-half 46 down until the shoulder knuckles 48 are resting on the shelf sections 52 that are cut into each side of the cone 34. As the front-half 46 is pressed down, the protrusion 54 in the center of the cone 34 spreads the shoulder knuckles 48 to the necessary position for the remaining stations.

As shown in FIGS. 6A-6B, the first press 64 preferably includes a flat front plate for contacting the bird. The first press 64 preferably contacts the upper portion of the breast meat 68 of the bird 46 and pushes the bird forward on the cone 34. The second press 66 preferably includes two arms 80 for contacting opposite sides of the bird. The second press 66 contacts the breast meat 68 of the bird 46 above the shoulder knuckles 48 and pushes downward to seat the bird on the cone 34. In one embodiment, the two arms 80 are separate pieces that are connected as shown in FIG. 6B. In an alternative embodiment, a single plate includes the two arms 80. In this alternative embodiment, the two arms 80 are separated by a notch for clearance of the bird neck 84. The arms 80 have a slight bevel to hold the shoulder knuckles inward so that they do not spread too much with the downward force of the second press 66.

Figure 7C:
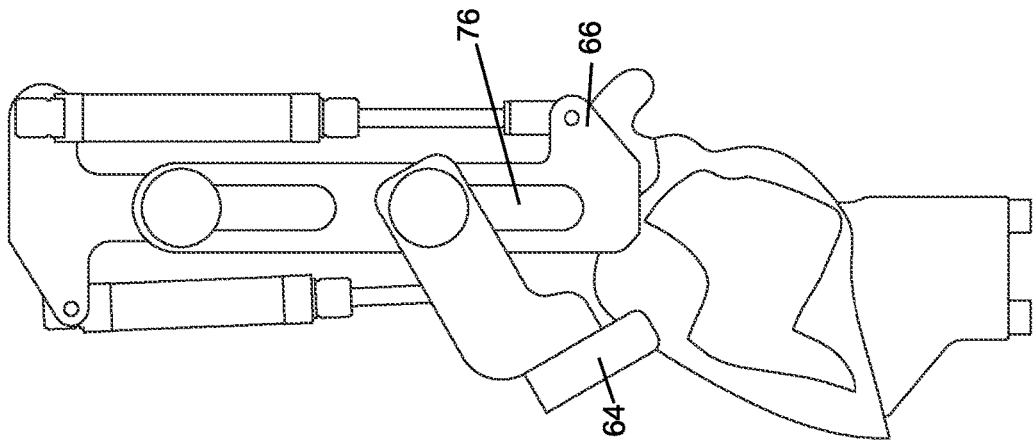
FIG. 7C is a side view of the press station of the press invention in the fully actuated position.
Figure 7B:
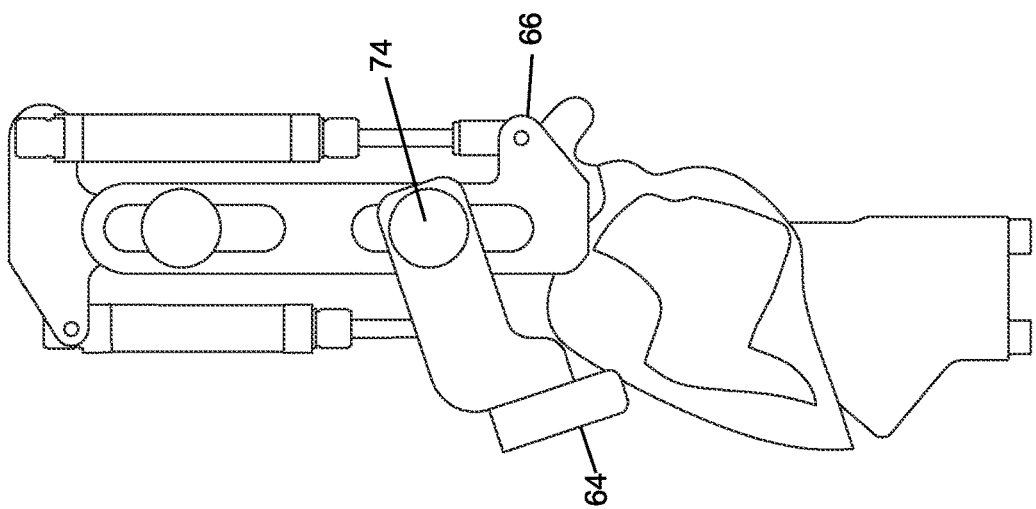
FIG. 7B is a side view of the press station of the present invention transitioning from the resting position to the actuated position.
Figure 7A:
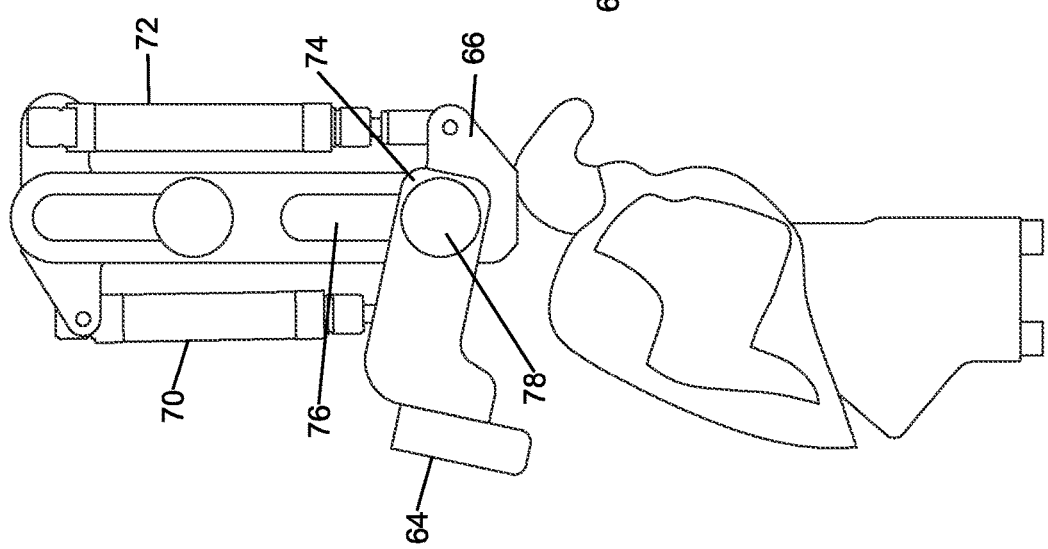
FIG. 7A is a side view of the press station of the present invention with the press station in the resting position.

As shown in FIGS. 7A-7C, the press station 14 includes a first (or forward) press actuator 70 and a second (or downward) press actuator 72 that move the presses 64, 66. The first press 64 is slidable connected to the second press 66 via a pivot rod 78. In the resting position, the first press 64 is positioned in the bottom of channel 76 of second press 66. As shown in FIG. 7B, once the presses 64, 66 are actuated by the press actuators 70, 72, the first press 64 swings downward at pivot point 74 and the second press 66 moves straight downward. When fully actuated, the first press 64 is positioned in the top of the channel 76 of second press 66, as shown in FIG. 7C.

Figure 8C:
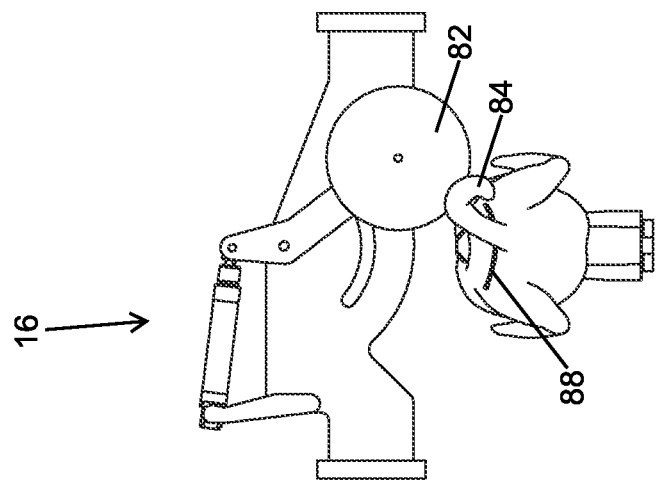
FIG. 8C is a perspective view of the skin cutter station of the present invention from the outlet end of the deboner system after the cut has been made.
Figure 8B:
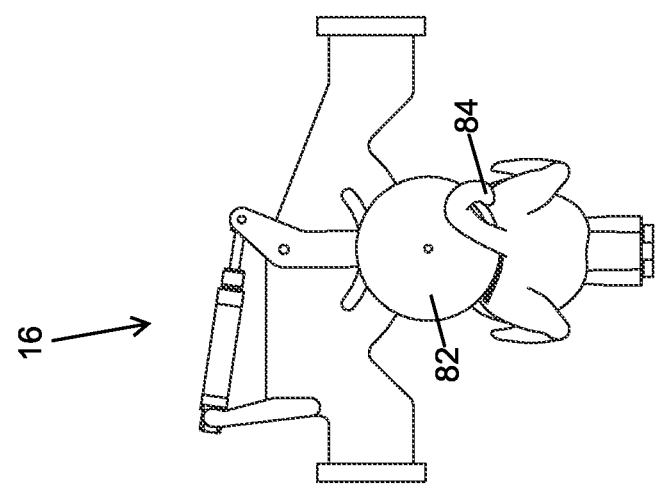
FIG. 8B is a perspective view of the skin cutter station of the present invention from the outlet end of the deboner system while the cut is being made.
Figure 8A:
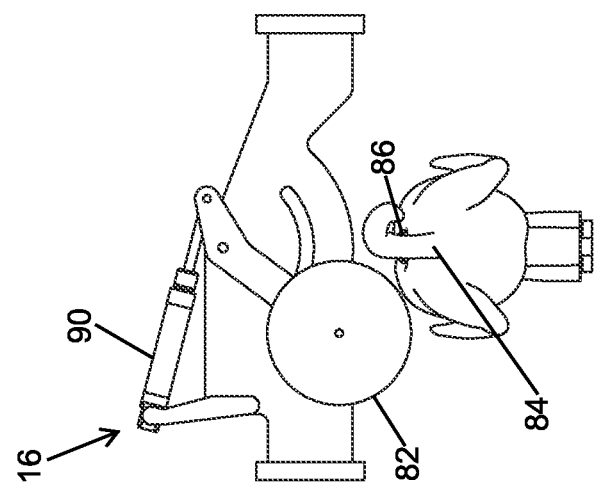
FIG. 8A is a perspective view of the skin cutter station of the present invention from the outlet end of the deboner system prior to the cut being made.
Figure 9B:
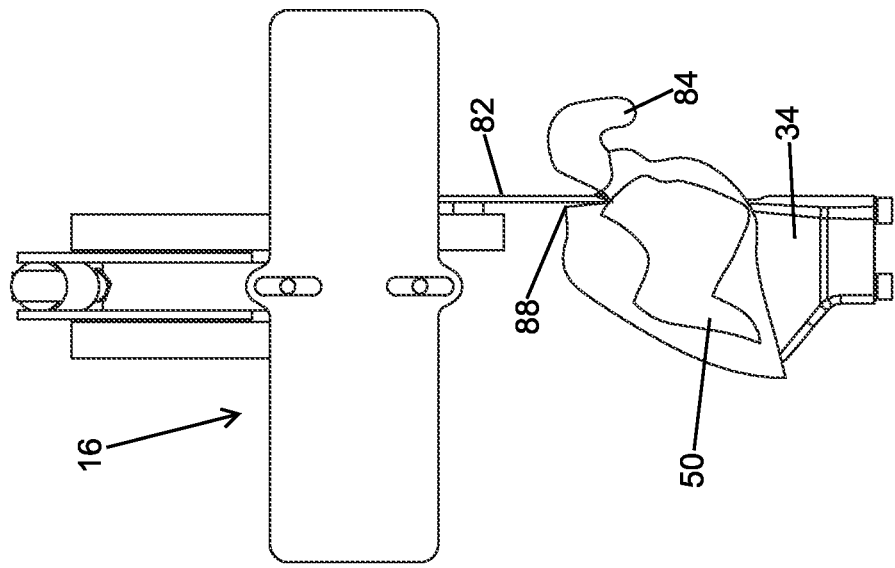
FIG. 9B is a side view of the skin cutter station of the present invention while the cut is being made.
Figure 9A:
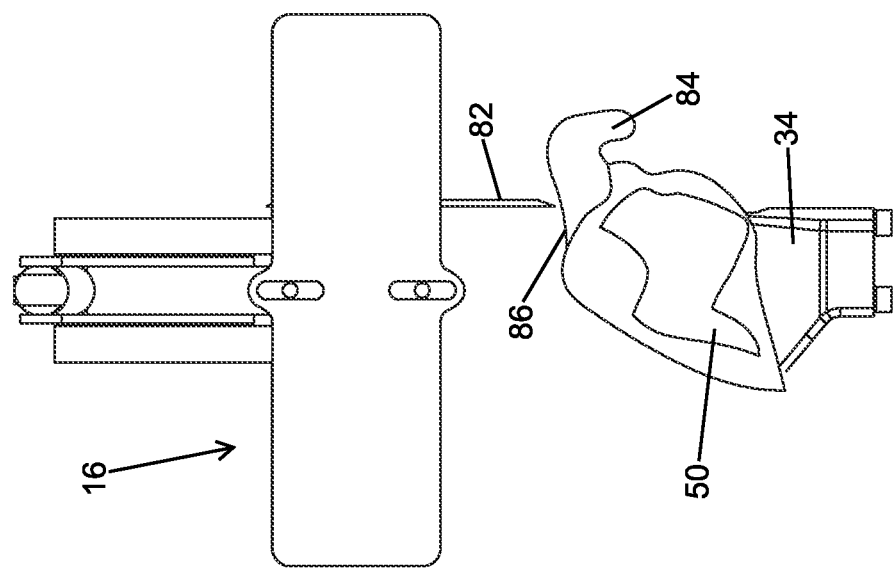
FIG. 9A is a side view of the skin cutter station of the present invention prior to the cut being made.

Skin Cutter Station:

From the press station 14, the front-half 46 indexes to the skin cutter station 16. Skin and fat are usually found in the area at the base of the neck 84 above the wishbone area of the bird. A flat cutting blade 82 is mounted on an arm that is connected to a skin cutter actuator 90. The skin cutter actuator 90 is mounted to the frame 44 above the primary conveyor belt 32. When activated, the cutting blade 82 swings perpendicular to the direction of the conveyor belt 32 and makes a cut 88 through the skin and fat 86 located at the base of the neck above the wishbone area. When the bird is positioned on the cone 34, the neck 84 of the bird 46 folds over the back of the bird. The skin cutter does not remove any meat. Instead, the skin cutter serves to sever these connection points to help to prepare the bird for further processing down the line. FIGS. 8A-8C show the skin cutter station and the bird before the cut is made (FIG. 8A), while the cut is being made (FIG. 8B), and after the cut is made (FIG. 8C). FIG. 9A shows the skin cutter station and the bird before the cut is made, while FIG. 9B shows the skin cutter station and the bird while the cut is being made.

Wing Cutter Station:

From the skin cutter station, the front-half 46 indexes to the wing cutter station 18. This station includes four critical components: two shoulder clamps 100, two wing cutter blades 102, two fixed guide plates 104, and two wing guides 106. The shoulder clamps 100 press down from above the bird and clamp onto the shoulder knuckles 48. This locks the bird into place and keeps it from moving during the wing cutting process. This aids in the precision of the wing cut and ensures the cut to be in the same place every time. While the shoulder clamps 100 are preferably separate plates, they are actuated together with a single actuator 198.

Each of the wing cutting blades 102 is a cylindrical blade that is hollow on the inside. This provides clearance for the wing to come up inside as the blade cuts around the wing knuckle 110 to disconnect it from the bird. Each rotating blade 102 is connected to two linkages or mounting arms 112 that are connected to an actuator 114. The actuators 114 are connected to the upper frame 44 and create the movement of the linkages 112 and the blades 102. The actuator 114 moves the blade down into a position where the edge of the blade 102 is between the wing knuckle 110 and the shoulder knuckle 48. The inside of the wing blade cutting edge is beveled to allow the wing bones to slide away from the cutting edge as the blade is actuated downwards while making its cut. The beveled edge aids in controlling the cut to only cutting flesh and connective tissue in the area.

Figure 10:
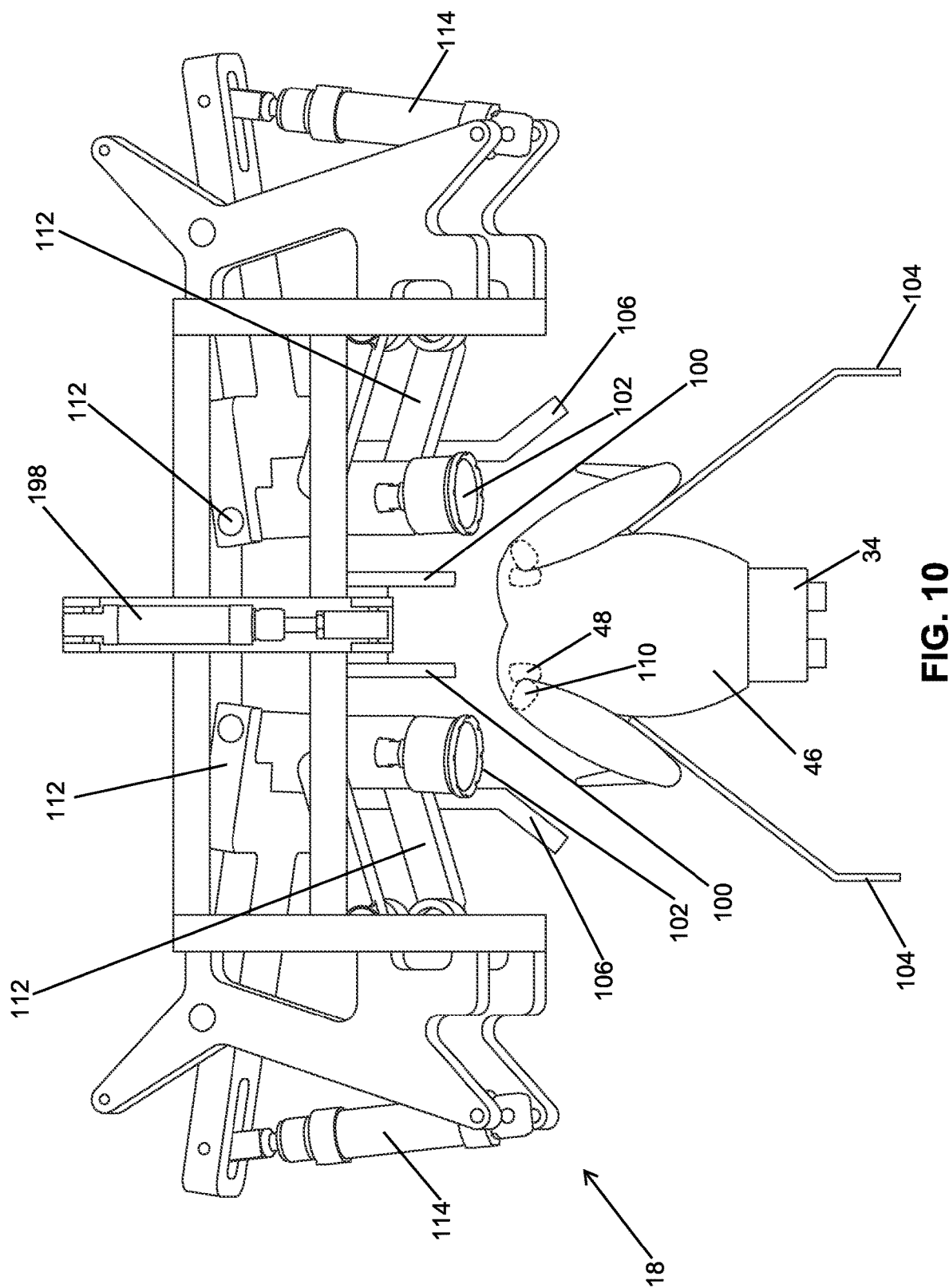
FIG. 10 is a perspective view of the wing cutter station of the present invention from the outlet end of the deboner system.

The fixed guide plates 104 keep the wings from resting too close to the body of the front-half 46 and provide support for the wing when the blade 102 contacts it. The guide plates 104 are connected to the side of the conveyor belt 32. As the cone 34 moves into the wing cutter station 18, the fixed guide plates 104 slide between the wings 50 and the front-half 46 and slightly lift the wings 50. The leading edge of the guide plates 104 has a tab 108 that is bent slightly inward and downward. The tab 108 catches under the wing and the wing then slides over the top of the guide plate 104. This ensures that the guide plates 104 hold the wings in the correct position before cutting. Because the guide plates 104 are angled downward and outward from the conveyor belt 32 as shown in FIG. 10, the guide plate 104 holds the wing steady and provides support underneath the wing 50 as the blade 02 cuts through the joint area and presses down.

Figure 11B:
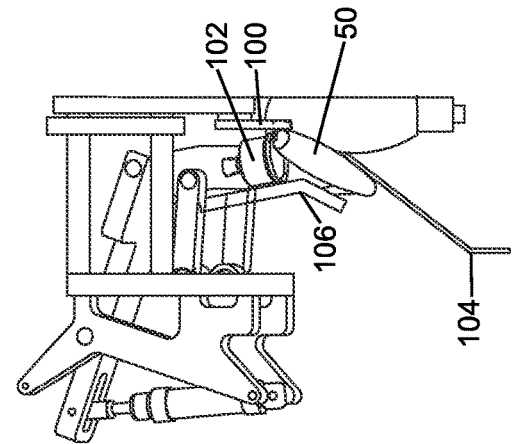
Figure 11A:
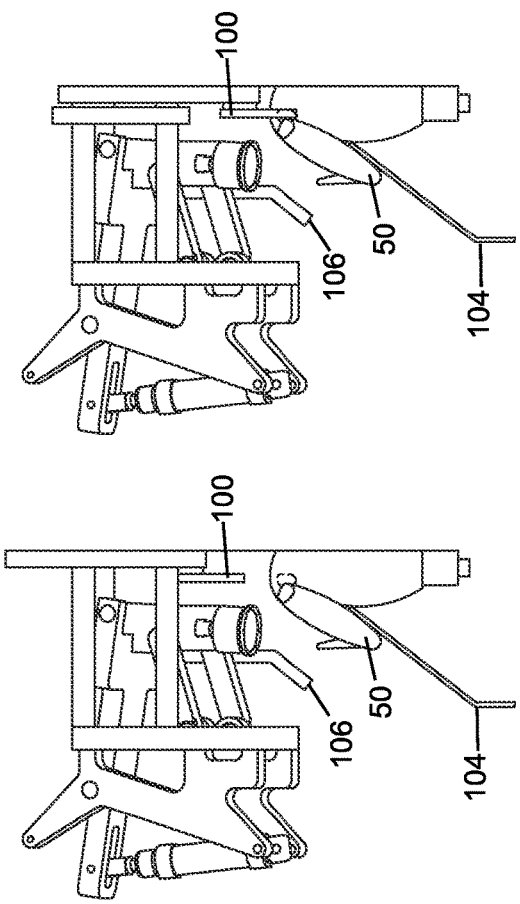
Figure 11C:
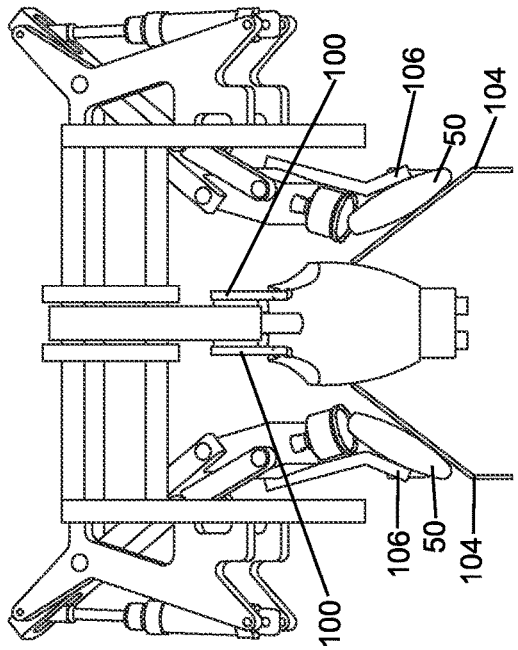
Figure 11E:
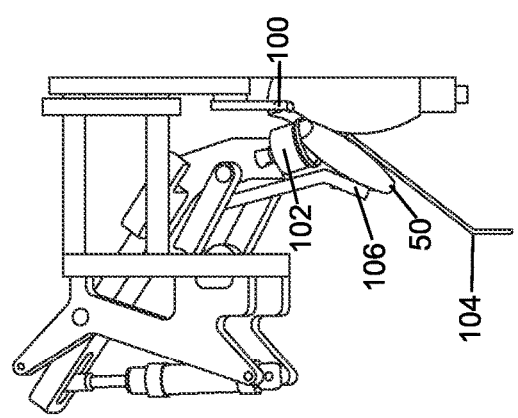
Figure 11F:
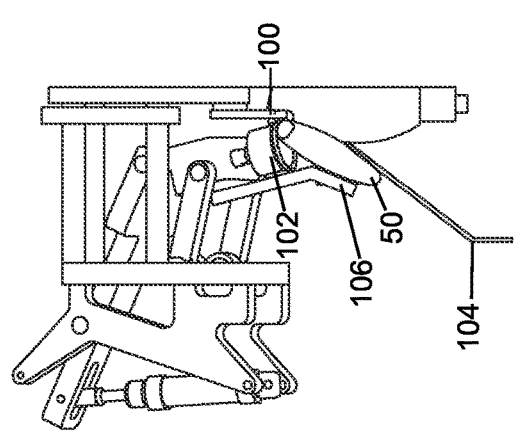
Figure 14A:
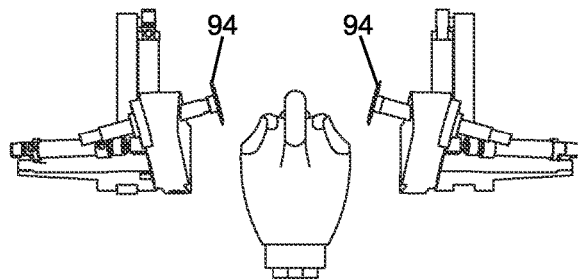
FIGS. 14A-14F are perspective views of the scapula cutter station of the present invention from the outlet end of the deboner system in six sequential steps starting with FIG. 14A and ending with FIG. 14F.
Figure 14B:
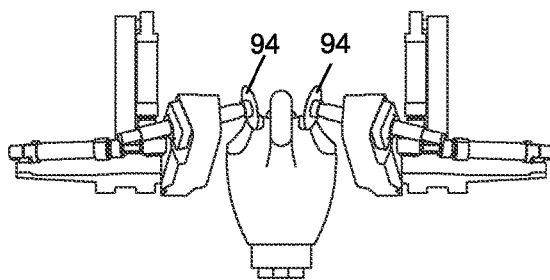
Figure 14C:
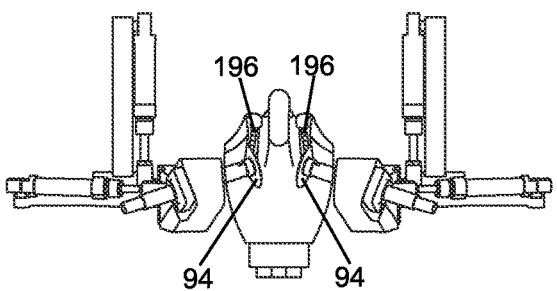
Figure 14D:
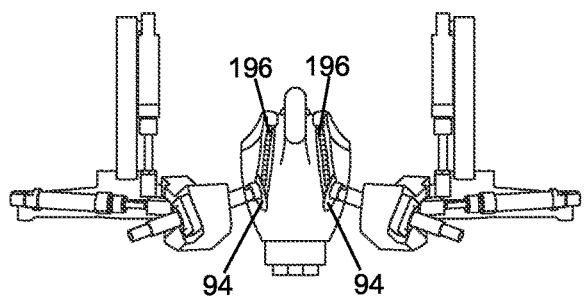
Figure 14E:
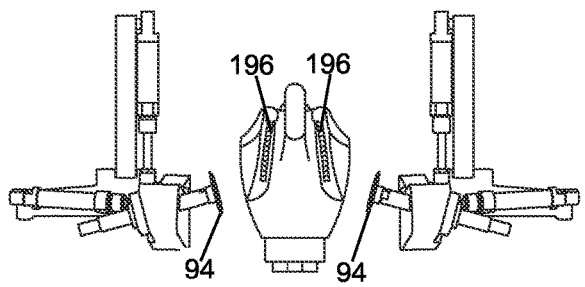
Figure 14F:
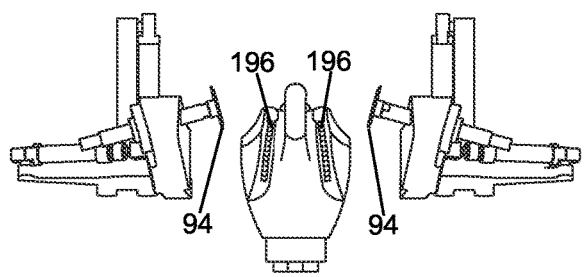
Figure 15C:
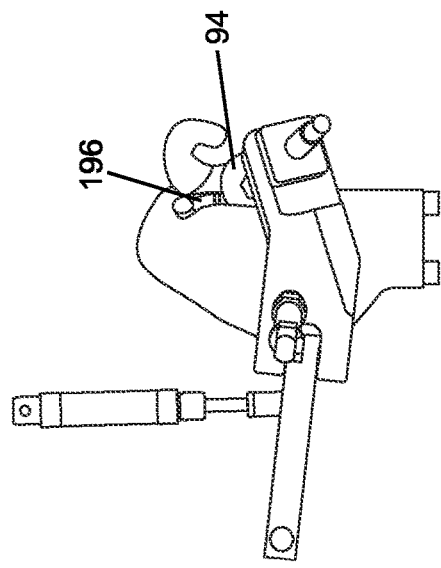
Figure 15A:
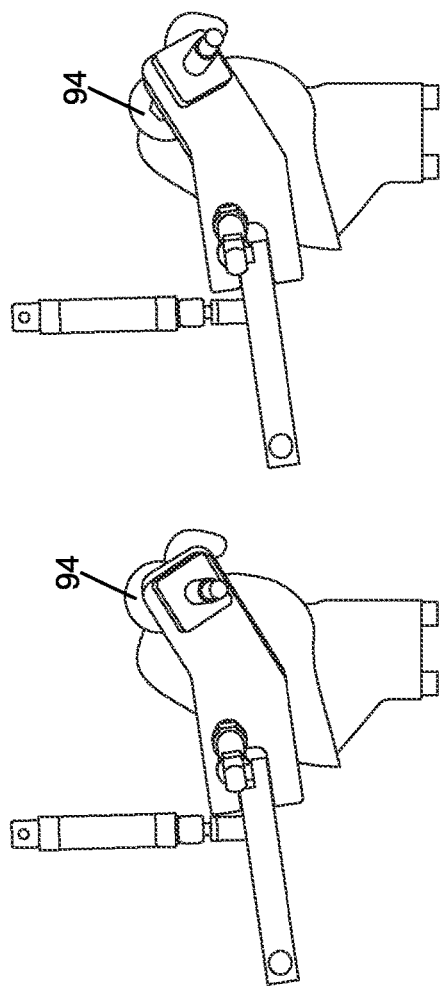
Figure 15F:
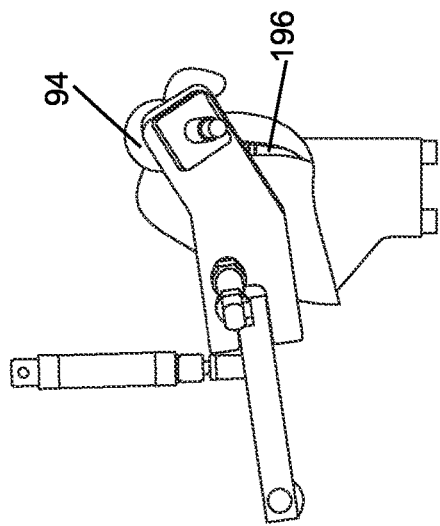
Figure 15E:
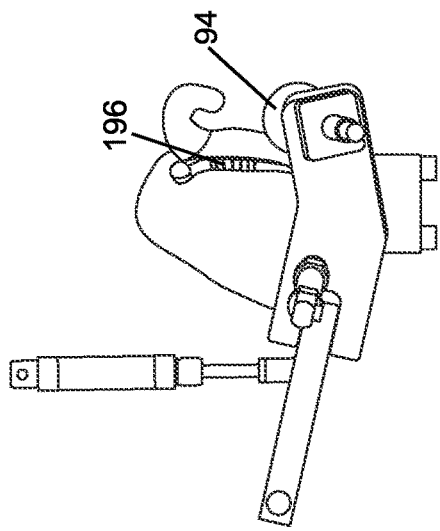
Figure 15D:
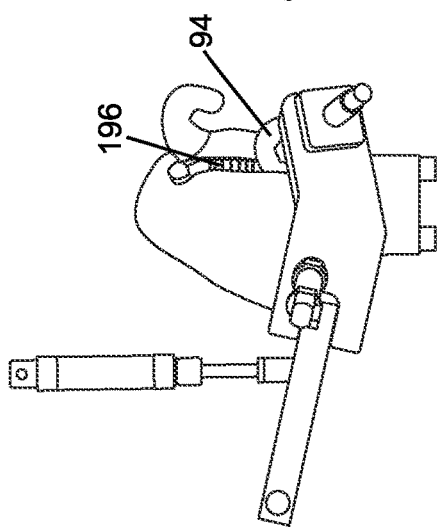

Wing guide arms 106 work in combination with the fixed guide plates 104. The wing guides 106 are attached to the same linkage as the wing cutter blades 102 and therefore they all move together. As each wing cutter blade 102 is actuated down and cuts through the joint, the wing guide 106 moves with the blade 102 and sandwiches the wing 50 between the wing guide 106 and the guide plate 104, as shown in FIGS. 11A-11F. This holds the wing in place and keeps it from rotating while the cut is made. If the wing manages to rotate, the possibility of cutting through bone, skin, or meat increases. Once the wing cut is made, the wing blade 102 is held down until the cone 34 with the front-half 46 indexes forward to the next station. As shown in FIG. 11F, this allows the blade 102 (in addition to the guide plate 104 and wing guide 106) to hold the wing 50 in place as the front half 46 moves away from the wing cutter station 18 to finish cutting or tearing any skin that may still be connected to it. As indexing occurs, the wing blade 102 and wing guide 106 both return to home position, which frees the cut wing. The wing then slides down the guide plate 104 into a chute or wing transfer conveyor 38 to direct the wing wherever necessary in the processing plant, as shown in FIG. 12F.

Scapula Cutter Station:

The front-half 46 then indexes to the scapula cutter station 20. There are two scapula bones 92 (one on each side of the bird) that are connected to the bottom of the shoulder knuckles 48 and run down the back beside the neck of the bird. The scapula cutter station includes two scapula cutters (one for which side of the bird). Each scapula cutter includes a flat, circular blade 94 that rotates along its axis. Each scapula cutter is attached to the frame 44 via two linkages or mounting arms. As shown in FIGS. 13A-13B, the blade 94 of the scapula cutter is attached to the first linkage 96. The first linkage 96 is attached an actuator. The first linkage 96 is also connected to a second linkage or mounting arm 98. The second linkage or mounting arm 98 is also attached to the frame 44 and to an actuator. The first linkage or mounting arm 96 moves the blade 94 towards the front of the bird where the blade comes to rest on the shoulder knuckle 48 at an angle close to parallel with the scapula bone 92. The leading edge of the blade is slightly below the shoulder knuckle 48. The second linkage or mounting arm then drives the rotating scapula blade 94 downward following the length of the scapula 92. The scapula blade 94 travels along the scapula bone 92 and emits constant pressure to the bone as it cuts. This ensures that the blade makes a close cut to the bone and separates all the breast meat connected to this area, which aids in the ultimate removal of the breast meat further down the line. The circular scapula blade 94 has a bevel on its cutting edge that prevents any unwanted cutting through bone.

FIGS. 14A-14F and FIGS. 15A-15F illustrate the movements of the scapula cutter station in six sequential steps: (A) scapula blade in the out and up positions; (B) scapula blade in the in and up positions; (C) scapula blade in the in position and moving downward; (D) scapula blade in the in and down positions; (E) scapula blade in the out and down positions after the cuts 196 have been made; and (F) scapula blade in the out and up positions after the cuts 196 have been made.

Figure 16:
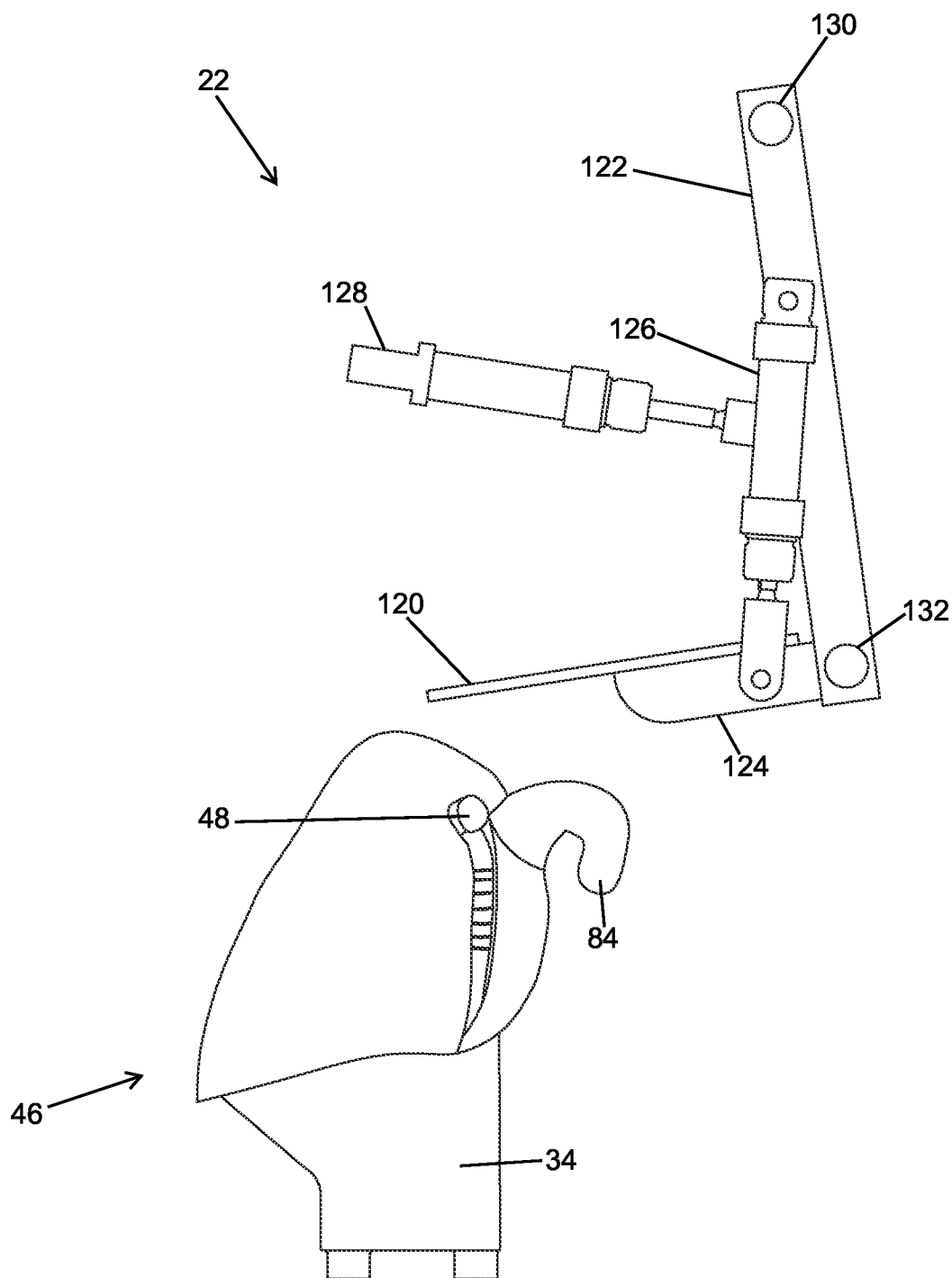
FIG. 16 is a side view of the wishbone cutter station of the present invention.
Figure 17D:
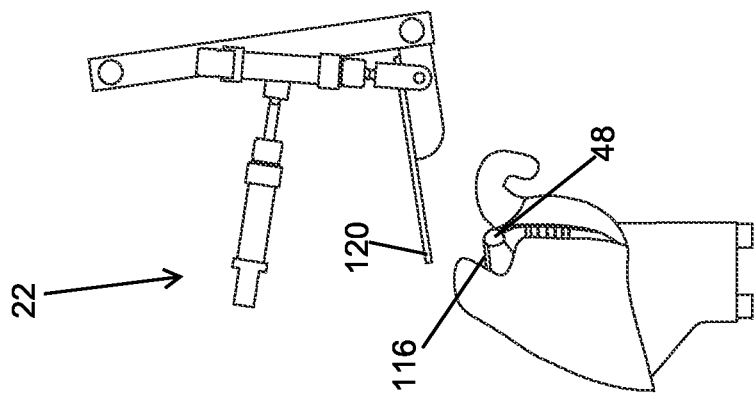
FIGS. 17A-17D are side view of the wishbone cutter station of the present invention in four sequential steps starting with FIG. 17A and ending with FIG. 17D.
Figure 17C:
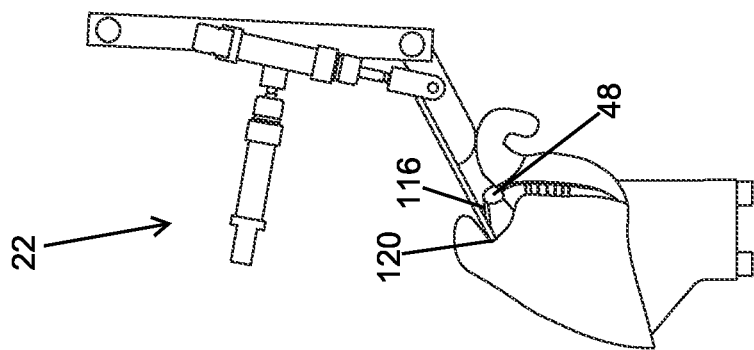
Figure 17B:
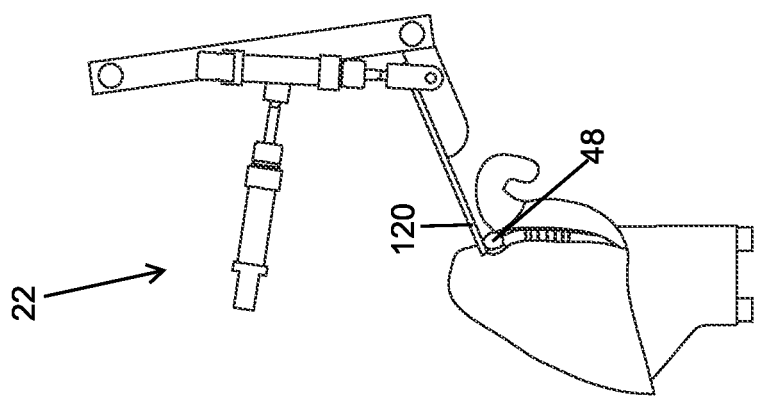
Figure 17A:
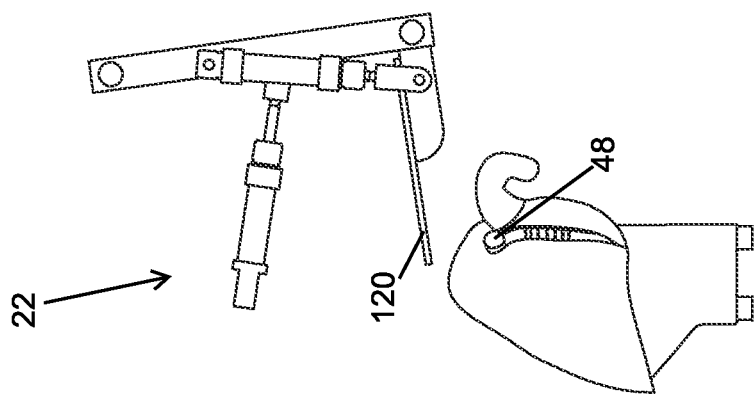

Wishbone Cutter Station:

The next station is the wishbone cutter station 22. The wishbone 116 is a thin and fragile y-shaped bone located under the breast meat 68. It is connected at each shoulder knuckle 48 and to the keel 118 of the bird 46. The breast meat 68 is connected around and across the entire length of the wishbone 116. This creates a very strong connection and makes clean breast meat removal difficult. If the wishbone 116 breaks, there is a high chance that it will remain attached to the breast meat 68 and will have to be located later and cut out by hand. The wishbone cutter station 22 does not cut the wishbone 116, but rather severs part of the connective meat and tissues that keep the breast meat 68 attached to the wishbone 116. As shown in FIG. 16, the wishbone cutter station 22 includes a wishbone blade 120 and two linkages or mounting arms attached to actuators. The first linkage or mounting arm 122 is attached to a rod that is attached to the frame 44. The first linkage 122 pivots on the rod at point pivot 130. An actuator 128 is connected to the first linkage 122 and to the frame 44. The first linkage 122 is connected to a second linkage 124 at pivot point 132. The wishbone blade 120 is attached to the second linkage 124. Actuator 126 is connected to both the first linkage 122 and the second linkage 124.

Figure 18B:
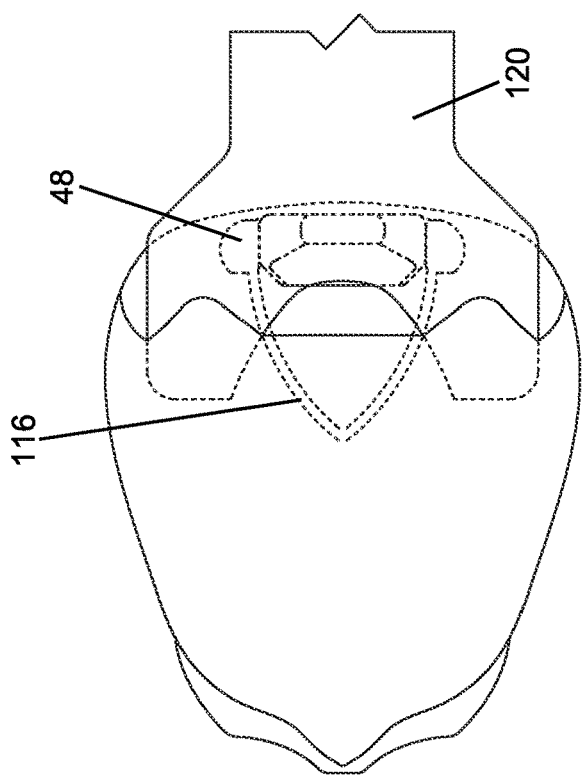
FIGS. 18A-18B are top views of the wishbone blade of the wishbone cutter station of the present invention.
Figure 18A:
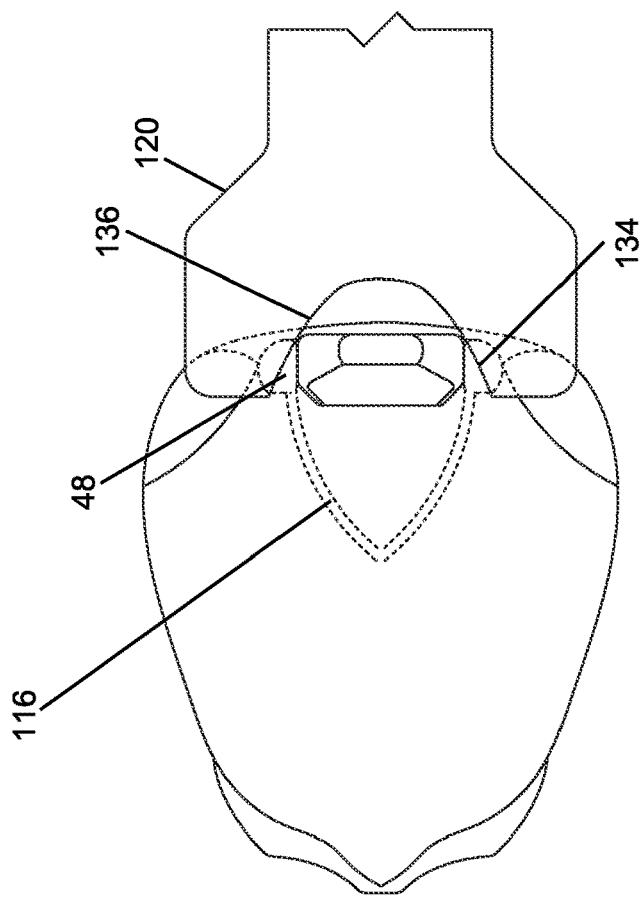

As shown in FIGS. 17A-17D, the actuator 126 first moves the wishbone blade 120 down onto the wishbone 116 and places the leading edge of the blade 120 close to the shoulder knuckles 48. The actuator 128 then pushes the blade 120 across the top of the wishbone 116 and separates the breast meat 68 from the connective tissues. This helps to prepare the breast meat 68 for removal later down the line. As shown in FIG. 18A-18B, the wishbone blade 120 has a relief 136 and a cutting edge 134. The relief 136 ensures that the blade 120 correctly contacts the wishbone 116. The blade 120 moves along the top of the wishbone. The relief 136 allows the outside of the blade 120 to drop lower than the center of the blade 120 so that the outside of the blade 120 extends below the breast meat 68 to help separate it from the wishbone 116. As the blade 120 travels through its stroke, the width of the wishbone 116 narrows. Thus, the contact area between the relief 136 and the wishbone 116 is narrower. This allows the blade 120 to drop lower as it makes its stroke.

Breast Plow Station:

After the scapula and wishbone cutters have performed their tasks, the bird is indexed to the breast plow station 24. A portion of the breast meat 68 is attached to the side of the carcass 46 at the ribs 138 and below the tenders 140. The task of the breast plow station 24 is to sever this connection. The breast plow station 24 is attached to the frame 44 by fixed rods 150 on which the breast plow station 24 is slidable, as shown in FIGS. 19A-19D. The breast plow station 24 includes two breast plows 142 and two shoulder clamps 144. The breast plows 142 are each preferably a plate with a dull edge for scraping and pulling the breast meat. The shoulder clamps are connected to and controlled by an actuator 146. The shoulder clamps 144 first actuate down over the shoulder knuckles 48 and apply pressure to hold the bird 46 down onto the cone 34. This locks the front-half 46 in place and keeps any unwanted movement from occurring as the breast plow plates 142 perform. Without the clamps 144, the plow plates 142 could tear the front-half in half and damage a lot of the meat.

Each of the breast plows 142 are connected to and controlled by actuator 202 and actuator 148. With the shoulder clamps 144 contacting the shoulder knuckles 48, the breast plow plate 142 on each side of the bird 46 are actuated together inwards by actuator 202 so the plow plates 142 contact the bird 46. The tip of each plow plate 142 contacts the bird below the tender 140 and shoulder knuckle 48. The plates are then actuated by actuator 148 in a direction approximately parallel with the tenders 140. As the plates slide across the bird, they maintain inward pressure and disconnect the breast meat from the sides of the bird carcass. In one embodiment, the lower portion of the plow plates 142 slides through the cut made by the scapula blade 94, while the upper portion of the plow plates 142 slides through the opening left when the wings 50 of the bird were removed. This method uses the anatomy of the front-half as a guide and allows the plow plates 142 to self-adjust to the various widths and sizes of carcasses 46 processed through the deboner system 10. The action of the breast plow station is shown step-by-step in FIGS. 19A-19D and FIGS. 20A-20D.

Wishbone Paddle Station:

The bird then indexes to the wishbone paddle station 26. While the wishbone cutter station 22 disconnected some of the breast meat 68 from the wishbone 116, the wishbone paddle station further disconnects the breast meat 68 from the wishbone 116. The wishbone paddle station includes a support 152 connected to the frame 44 of the deboner system 10, shoulder clamps 162, a wishbone paddle 160, and two actuators 154, 156 to move and control the wishbone paddle 160. The support 152 includes two channels for receiving rods 158 that are attached to the frame 44. The wishbone paddle station is slidable on the rods 158, as shown in FIGS. 21A-21D. One actuator 154 of the wishbone paddle station controls the rotation of the wishbone paddle 160, while the other actuator 156 controls the upward and downward movement of the support 152 and thus the wishbone paddle 160 attached to the support 152.

Figures 21A, 21B, 21C, 21D:
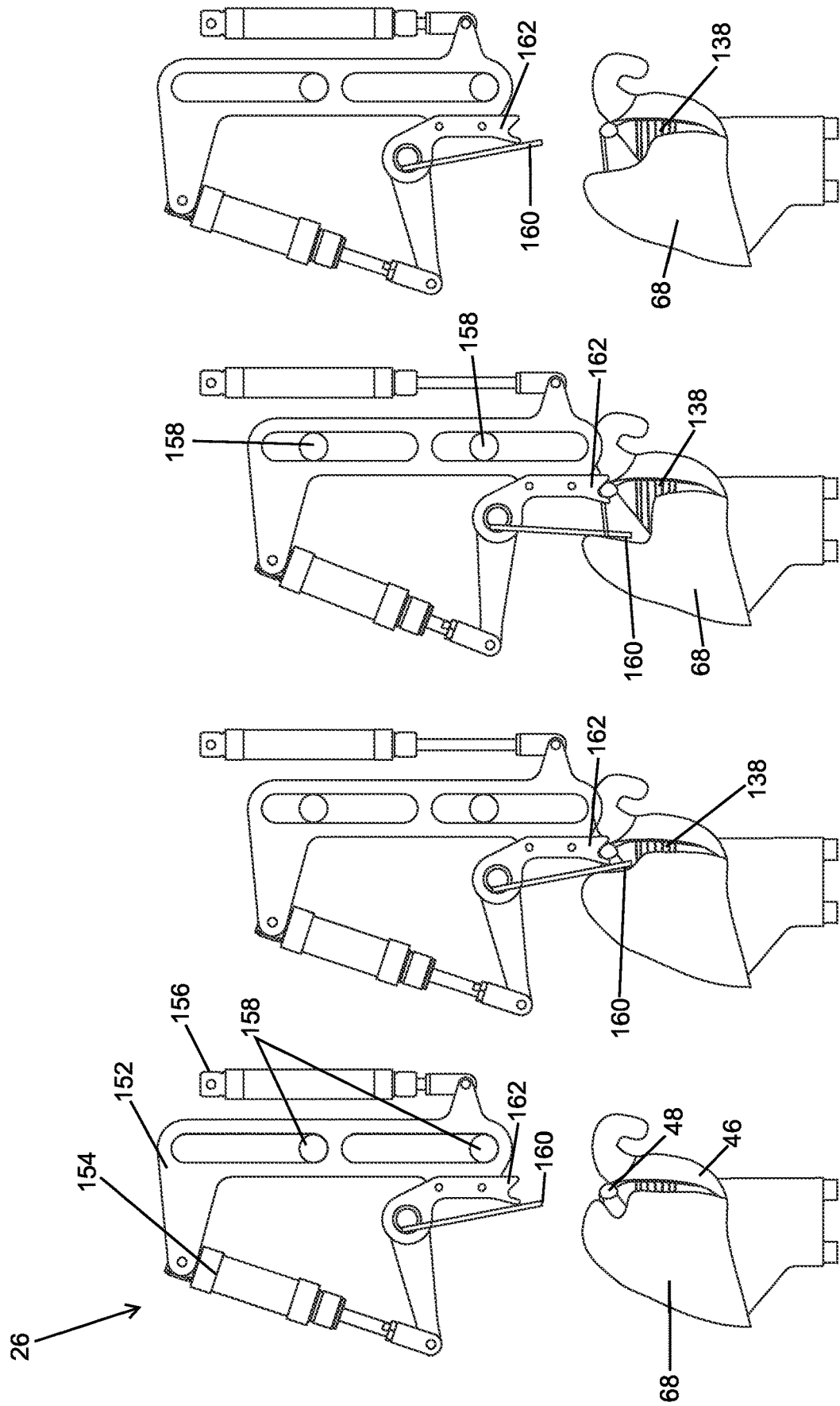
FIGS. 21A-21D are side views of the wishbone paddle station of the present invention in four sequential steps starting with FIG. 21A and ending with FIG. 21D.
Figures 23A, 23B:
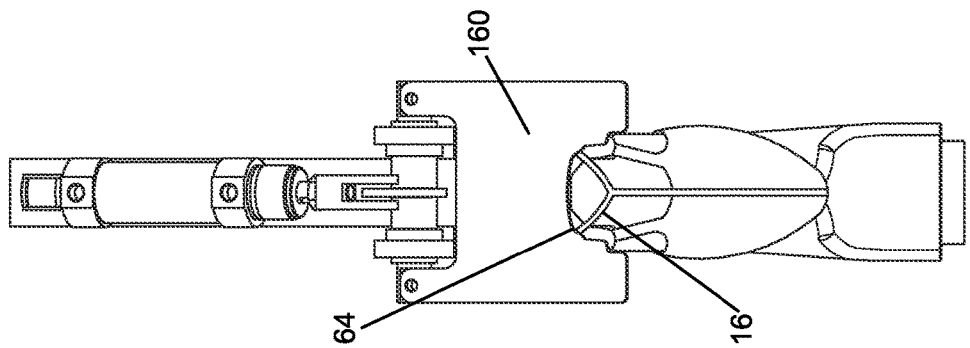
FIG. 23A is a perspective view of the wishbone paddle station of the present invention from the inlet end of the deboner system with the wishbone paddle in the down position.
FIG. 23B is a perspective view of the wishbone paddle station of the present invention from the inlet end of the deboner system with the wishbone paddle in the down position and the breast meat omitted.
Figures 22A, 22B:
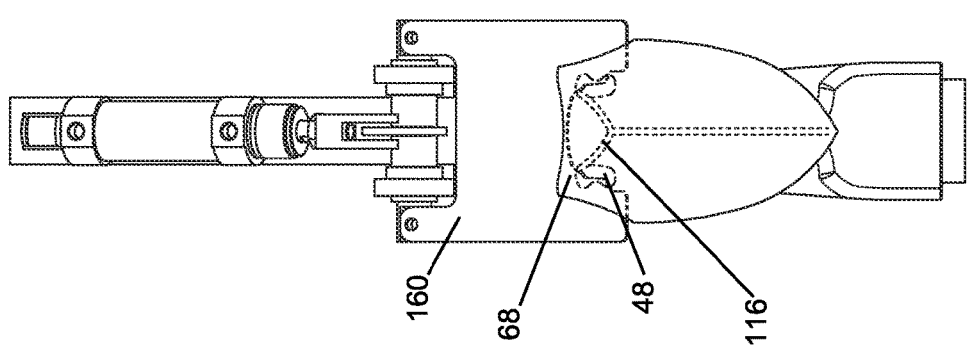
FIG. 22A is a perspective view of the wishbone paddle station of the present invention from the inlet end of the deboner system with the wishbone paddle in the up position.
FIG. 22B is a perspective view of the wishbone paddle station of the present invention from the inlet end of the deboner system with the wishbone paddle in the up position and the breast meat omitted.

The wishbone paddle 160 is a plate that slides down between the breast meat 68 and the shoulder knuckles 48. The wishbone paddle 160 has a notch or relief 164 in the center of it so that the wishbone paddle 160 can fit tightly over the wishbone 116. The wishbone paddle is connected to shoulder clamps 162 to hold the shoulder knuckles 48 in place. Thus, when the shoulder clamps 162 move downward to contact the shoulder knuckles 48 through the action of the actuator 156, the wishbone paddle 160 also moves toward the bird 46. As the shoulder clamps 162 first contact the shoulder knuckles 48, the bottom edge of the wishbone paddle 160 is positioned between the shoulder knuckles 48 and the breast meat 68, as shown in FIG. 21B. The actuator 154 moves the wishbone paddle 160 from a retracted position to an extended position. During that transition, the wishbone paddle 160 slides backward (toward the inlet end of the system 10) underneath the breast meat 68 to disconnect the breast meat 68 from the wishbone 116 enough to later allow the breast roller to easily remove the breast meat 68 without danger of breaking the wishbone. The outer portions of the wishbone paddle 160 extend lower than the center portion because of the notch or relief 164. This configuration allows the outer portions of the wishbone paddle 160 to be low enough to slide between the shoulder knuckles 48 and the breast meat 68 while the center portion is high enough to avoid pushing into and breaking the wishbone 116. The action of the wishbone paddle station is shown step-by-step in FIGS. 21A-21D. In FIG. 21A, the wishbone paddle 160 is in the up and retracted positions. In FIG. 21B, the wishbone paddle 160 is the down and retracted positions. In FIG. 21C, the wishbone paddle 160 is in the down and extended positions. In FIG. 21D, the wishbone paddle 160 is in the up and retracted positions after the wishbone paddle 160 has further disconnected the breast meat 68 from the wishbone 116.

Breast Removal Station:

Next, the front-half 46 is indexed to the breast removal station 28. Previous stations have cut the breast meat 68 loose from critical areas: the shoulder knuckle 48, the scapula bone 92, the wishbone 116, and the ribs 138. The breast meat 68 is now only attached below the tenders 140 and along the keel bone 118 that runs between the two tenders 140.

Figure 25B:
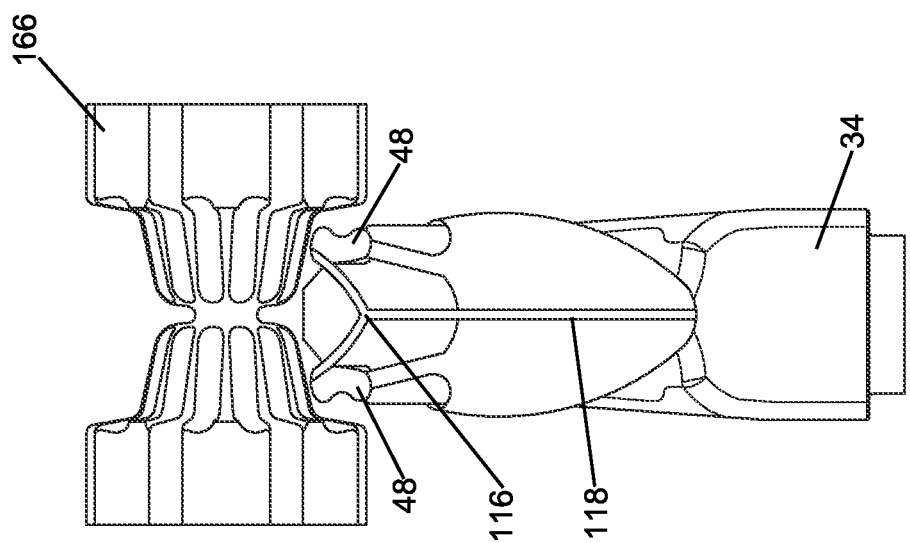
FIG. 25B is a perspective view of the roller of the breast removal station of the present invention from inlet end of the deboner system with the breast meat omitted.
Figure 25A:
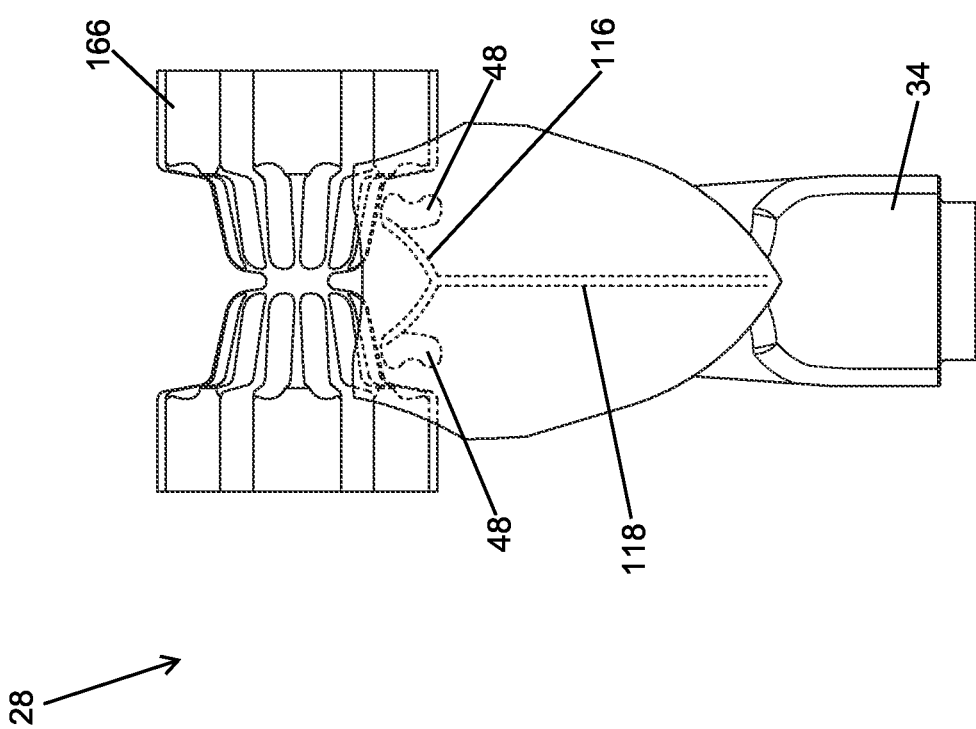
FIG. 25A is a perspective view of the roller of the breast removal station of the present invention from the inlet end of the deboner system.

When the breast removal roller station is activated, the roller 166 moves down through a track following the profile of the front-half 46. Through this action, the roller 166 completely removes the breast meat 68. As shown in FIGS. 25A-25B, the roller 166 is contoured to match the shape of the front-half of the bird. In other words, the roller 166 is contoured to clear the shoulder knuckles 48 and the wishbone 116, but contact the breast meat 68. To function in this manner, the outer portions of the roller 166 are lower than the center portion of the roller, as shown in FIGS. 25A-25B. The roller 166 has grooves cut into it that run axially across the roller and follow the contour of the roller. These grooves give the roller 166 more friction and biting traction when rotating and pulling the breast meat 68 from the front-half 46.

In the breast removal roller station 28, a set of shoulder clamps 168 is first activated by an actuator 170. The clamps 168 lock the bird 46 in place onto the cone 34 and prevent any unwanted movement of the bird 46 during the breast meat removal. The roller is then activated by an actuator 172. The roller is held and guided by tracks 174 cut into a side plate 176 located on each side of the roller 166. The track 174 follows the profile of the top of the bird 46 from the wishbone 116, to the keel bone 118, and down to the bottom of the bird 46. The tracks 174 have a gear rack on the top side. A mating gear is attached to the shaft of the roller on both sides. As the roller 166 is driven along the track 174, the gearing rotates the roller 166 in a direction the pulls the breast meat away from the front-half carcass 46, as shown in FIG. 24C. When the roller reaches the end of its stroke (and the end of the tracks 174), the breast meat 68 has been completely removed from the front-half 46. The breast meat 68 falls through the gap 62 in the conveyor belt 32 onto a tray on a breast transfer conveyor 40 below where it is guided to wherever necessary. The action of the breast removal roller station 28 is shown step-by-step in FIGS. 24A-24F. In FIG. 24A, the shoulder clamps 168 are in the up position and the roller 166 is in the up position. In FIG. 24B, the shoulder clamps 168 are in the down position and the roller 166 is in the up position. In FIGS. 24C-24D, the shoulder clamps 168 are in the down position and the roller 166 is going down. In FIG. 24E, the shoulder clamps 168 are in the down position and the roller 166 is in the down position. In FIG. 24F, the shoulder clamps 168 are in the up position and the roller is in the up position after the breast meat 68 has been completely removed from the bird 46.

Figure 26A:
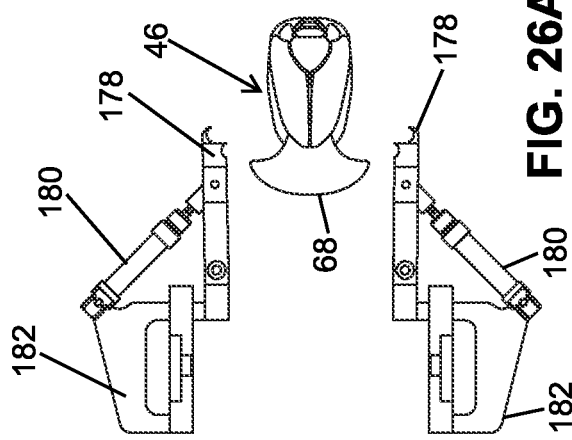
FIGS. 26A-26C are top views of the breast paddles of the present invention in three sequential steps starting with FIG. 26A and ending with FIG. 26C.
Figure 26B:
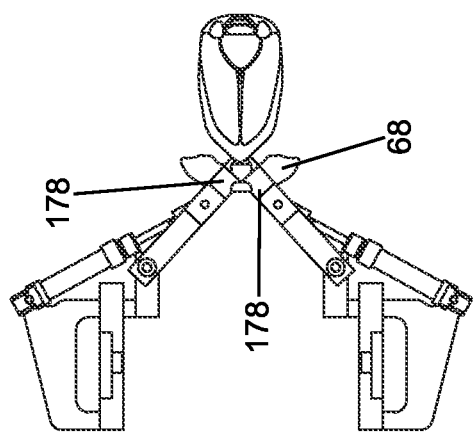
Figure 26C:
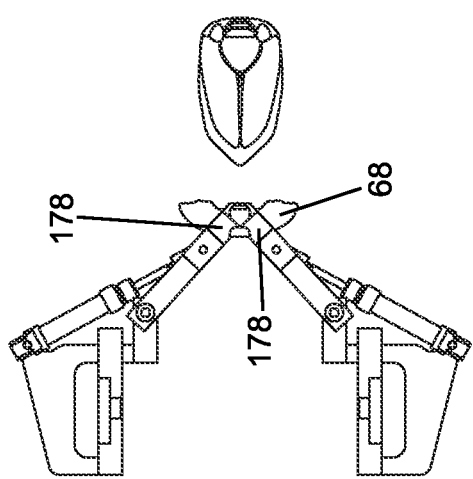
Figure 27A:
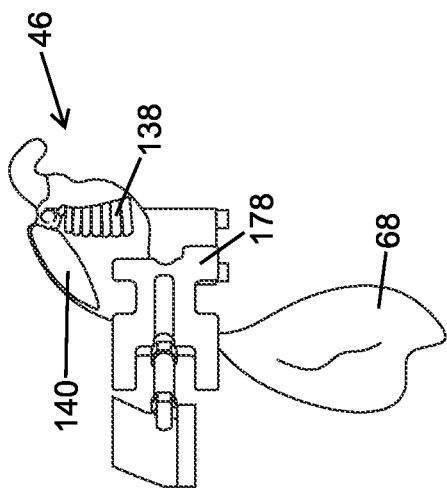
FIGS. 27A-27C are side views of the breast paddles of the present invention in three sequential steps starting with FIG. 27A and ending with FIG. 27C.
Figure 27B:
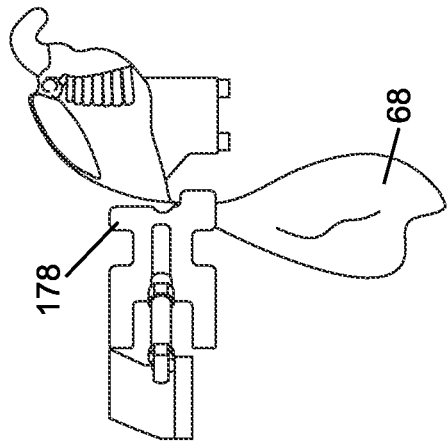
Figure 27C:
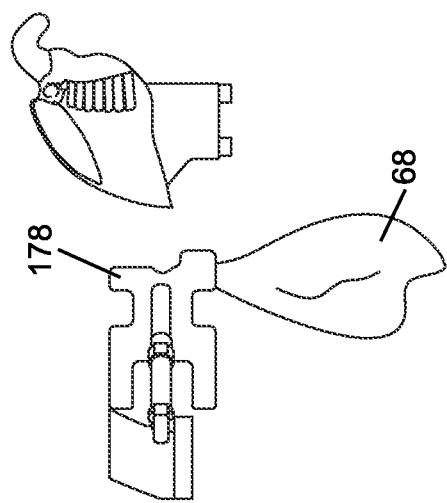

On occasion, the breast meat 68 may remain lightly attached to the bottom of the carcass 46, as shown in FIG. 26A and FIG. 27A. To remedy this, a set of breast paddles 178 are used to grab the hanging breast meat 68 as the front-half 46 indexes to the final station. The paddles 178 are attached to supports 182 that are attached to the frame 44 of the system. The paddles 178 are also attached to actuators 180 that move and control the paddles 178. Upon activation by the actuators 180, the paddles 178 quickly grab the breast meat 68, as shown in FIG. 26B and FIG. 27B. After the breast meat is pulled from the front-half 46, the paddles 178 release the breast meat 68 and the breast meat 68 falls through the gap 62 in the conveyor belt 32 onto the tray on the breast transfer conveyor 40 below. The action of the breast paddles is shown step-by-step in FIGS. 26A-26C and FIGS. 27A-27C. In FIGS. 26A and 27A, the paddles 178 are open on the side of conveyor belt 32 as the cone 34 with the bird 46 is positioned between the paddles 178. The paddles 178 then close on the breast meat 68 attached only at the bottom of the front-half 46, as shown in FIG. 26B and FIG. 27B. As the front-half 46 on the cone 34 moves towards the next station, the breast meat 68 is detached from the front-half 46 and held between the paddles 178, as shown in FIG. 26C and FIG. 27C. The paddles 178 close each time a cone 34 passes through the paddles 178 regardless of whether the breast meat 68 is still attached to the front-half 46 or not.

Figure 29:
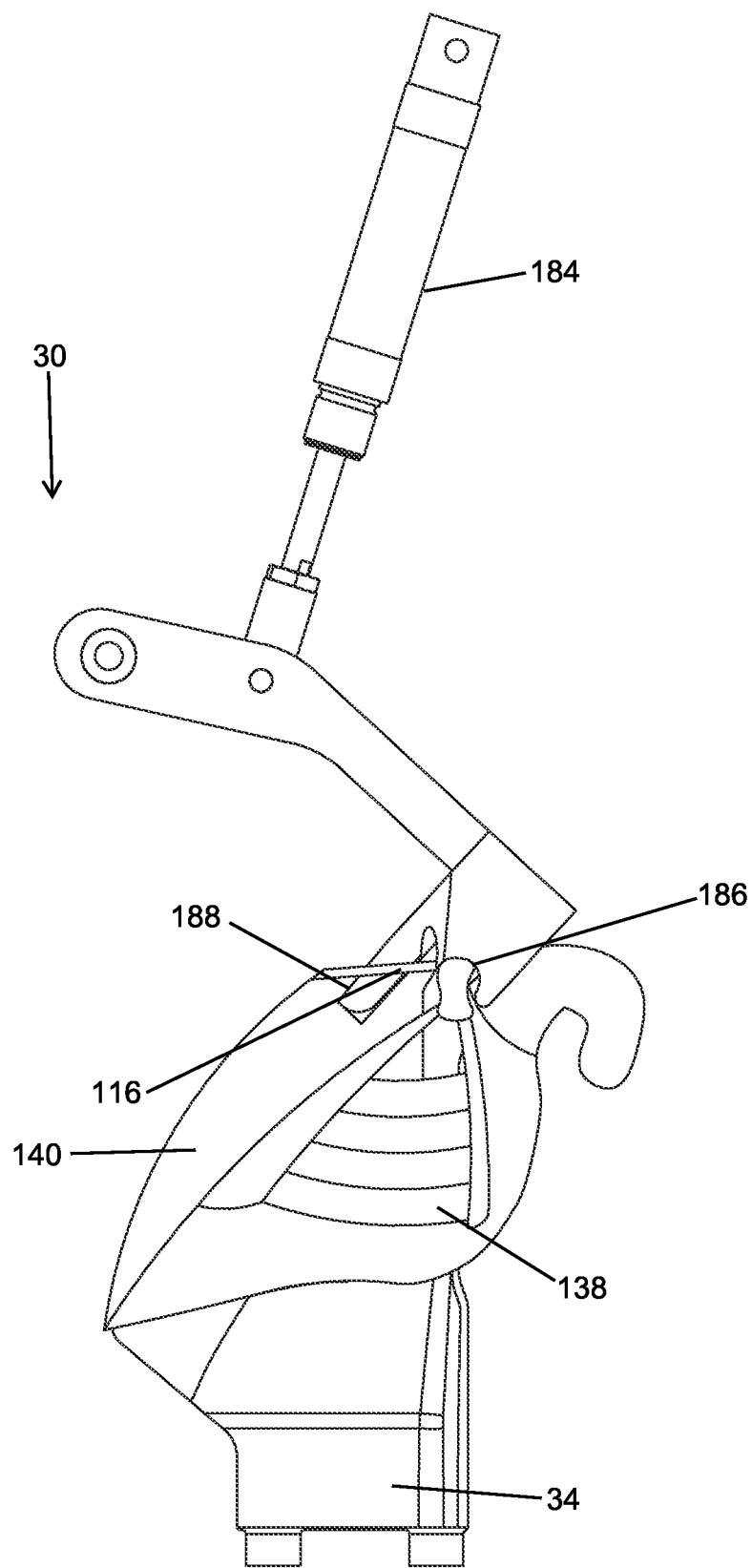
FIG. 29 is a side view of the tender shoulder clamp and tender spreader positioned on the front-half with the blades of the tender cutter station omitted.

Tender Cutter Station:

The last station of the deboner system 10 is the tender cutter station 30. This station utilizes two rotating blades 190 to cut and remove both tenders 140 from the front-half carcass 46. First, an actuator 184 attached to the frame 44 extends downward and pushes a shoulder clamp 186 on to the shoulder knuckles 48 to hold the shoulder knuckles 48 in place on the cone 34. As the shoulder clamp 186 comes down, a tender spreader 188, which is mounted in the middle of the shoulder clamp 186, slides through the gap in the center of the wishbone 116, as shown in FIG. 29. The spreader 188 contacts the inside of the tenders 140 and pushes them out from underneath the wishbone 116. This allows the tender cutting blades 190 to access the whole tender 140.

Figure 28C:
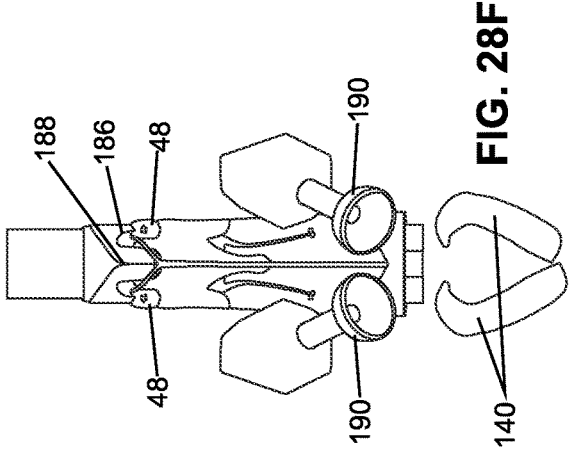
FIGS. 28A-28F are perspective views of the tender cutter station of the present invention from the inlet end of the deboner system in six sequential steps starting with FIG. 28A and ending with FIG. 28F.
Figure 28B:
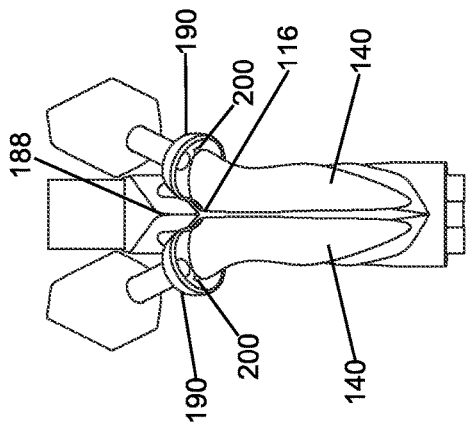
Figure 28A:
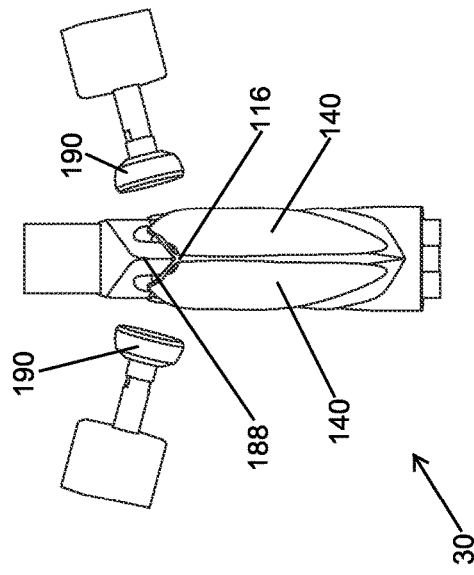

Once the shoulder clamp 186 and tender spreader 188 are in place, the tender blades 190 are pivoted inward by actuators to start the tender cut. Initially, as shown in FIG. 28A, the tender blades 190 are held in a spot where they can pivot inward with a pivot point approximately centered on a natural arc made by the wishbone 116. As the blades pivot in, as shown in FIGS. 28B-28C, the blades 190 contact the tender 140 right behind the shoulder knuckle 48 and below the wishbone 116. At that point, a tendon 200 attaches the tender 140 to the shoulder knuckle 48. The placement of the initial cut ensures that the tendon 200 remains attached to the shoulder knuckle 48 and not to the tender 140. It is typical in other deboning systems for this tendon to require a separate station or a person to make these cuts.

Figure 28F:
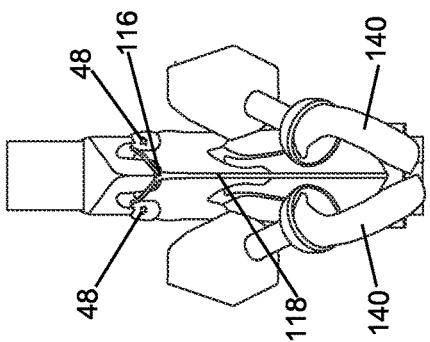
Figure 28E:
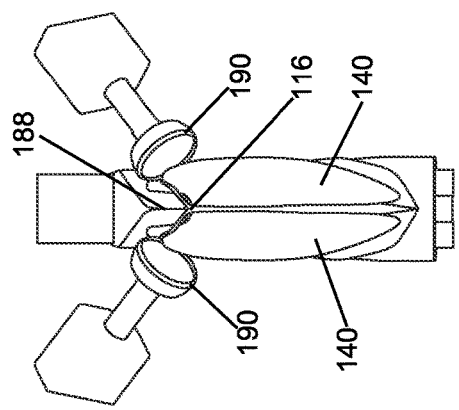
Figure 28D:
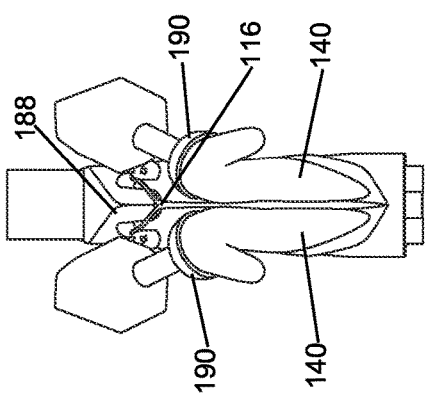

After cutting the tendon, the axis of the blades is close to parallel with the keel bone, as shown in FIG. 28D. A second set of actuators then pushes the blades 190 down and towards the back of the carcass 46. The rotating blade edge travels with even pressure against the side and bottom of the keel bone 118. The rotating blade edge follows the contour of the keel bone 118 until the tender 140 is completely removed from the carcass 46. The outer edge of the cupped blade 190 has a bevel that moves the cutting edge away from the outer diameter. This allows the diameter of the blade to be used as the guide along the carcass 46 and keel bone 118 to ensure a good tender cut. The shallow cupping of the blade 190 helps to scoop the tender 140 off the carcass 46 as it cuts away. Once the tenders 140 are cut from the carcass 46, they fall through an opening 62 in the conveyor belt 32 onto the tender transfer conveyor 42 where they can be directed wherever necessary.

The action of the tender cutter station is shown step-by-step in FIGS. 28A-28F. In FIG. 28A, the shoulder clamp 186 and the spreader 188 are in the down position while the blades 190 in the out and up positions. FIG. 28B shows the shoulder clamp 186 and spreader 188 in the down position with the blades in the up position and moving inward. FIG. 28C shows the shoulder clamp 186 and spreader 188 in the down position with the blades in the in and up positions. FIGS. 28D-28E show the shoulder clamp 186 and spreader 188 in the down position with the blades in the in position and moving downward. FIG. 28F shows the shoulder clamp and spreader in the down position and the blades in the in and down positions after the tenders have been completely removed from the carcass 46.

As described throughout this Detailed Description, the deboner system includes a numerous actuators. The actuators are preferably pneumatic cylinders because they are simple, cost effective, clean, reliable, and easy to maintain. However, it should be understood that the actuators could alternatively be electric actuators, hydraulic cylinders, mechanical linkage systems, or other types of actuators that would be well-known to a person of ordinary skill in the art. It should also be understood that some of the stations may be omitted from the deboner system depending on the needs of the processing plant.

The present invention has been described with reference to certain preferred and alternative embodiments that are intended to be exemplary only and not limiting to the full scope of the present invention as set forth in the appended claims.

We claim:

1. A support for carrying a front-half of a chicken through a deboning process, said support comprising:
   an upper portion, wherein said upper portion comprises:
      a first shelf and a second shelf, wherein said first shelf and said second shelf are configured to rest under shoulder knuckles of a front-half of a chicken; and
      a protrusion positioned between said first shelf and said second shelf, wherein said protrusion is configured to spread said shoulder knuckles of said front-half of said chicken;
   a lower portion joined to said upper portion, wherein a first section of said lower portion slopes downward and outward from said upper portion, wherein a second section of said lower portion slopes downward and inward from said first section of said lower portion; and
   a base for attaching to a conveyor belt.

2. The support of claim 1, further comprising an opening in a back surface of said support, wherein said opening is configured to receive at least a portion of an internal part of said front-half of said chicken.

3. The support of claim 1, wherein said lower portion is configured to rest under a breast meat of said front-half of said chicken.

* * * * *